(12) United States Patent
Imai et al.

(10) Patent No.: US 8,659,726 B2
(45) Date of Patent: Feb. 25, 2014

(54) LIQUID CRYSTAL DISPLAY AND METHOD OF MANUFACTURING LIQUID CRYSTAL DISPLAY

(75) Inventors: Hajime Imai, Osaka (JP); Tetsuo Kikuchi, Osaka (JP); Hideki Kitagawa, Osaka (JP); Yoshihito Hara, Osaka (JP); Junya Shimada, Osaka (JP); Mitsunori Imade, Osaka (JP); Yoshiharu Kataoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1169 days.

(21) Appl. No.: 12/595,782

(22) PCT Filed: Dec. 27, 2007

(86) PCT No.: PCT/JP2007/075147
§ 371 (c)(1),
(2), (4) Date: Oct. 13, 2009

(87) PCT Pub. No.: WO2008/129748
PCT Pub. Date: Oct. 30, 2008

(65) Prior Publication Data
US 2010/0053517 A1    Mar. 4, 2010

(30) Foreign Application Priority Data
Apr. 13, 2007  (JP) ................................. 2007-105996

(51) Int. Cl.
*G02F 1/1335* (2006.01)
*G02F 1/136* (2006.01)

(52) U.S. Cl.
USPC ............... 349/113; 349/43; 349/114

(58) Field of Classification Search
USPC ................ 349/38, 39, 113, 114, 129, 130
See application file for complete search history.

(56) References Cited

U.S. PATENT DOCUMENTS

| 4,345,249 A | 8/1982 | Togashi |
| 4,519,678 A | 5/1985 | Komatsubara et al. |

(Continued)

FOREIGN PATENT DOCUMENTS

| EP | 1 744 204 A1 | 1/2007 |
| JP | 63-296004 | 12/1988 |

(Continued)

OTHER PUBLICATIONS

U.S. Office Action mailed Dec. 7, 2011 in U.S. Appl. No. 12/306,959.

(Continued)

*Primary Examiner* — Edward Glick
*Assistant Examiner* — David Chung
(74) *Attorney, Agent, or Firm* — Nixon & Vanderhye P.C.

(57) ABSTRACT

Transflective-type and reflection type liquid crystal display devices having a high image quality are provided with a good production efficiency.

A liquid crystal display device according to the present invention is a liquid crystal display device which includes; a first substrate and a second substrate between which liquid crystal is interposed; a first electrode and a second electrode formed on the first substrate for applying a voltage for controlling an orientation of the liquid crystal; a transistor having an electrode which is electrically connected to the first electrode; a metal layer being formed on the first substrate and including a protrusion, a recess, or an aperture; and a reflective layer formed above the metal layer on the first substrate for reflecting incident light toward a display surface. The metal layer is made of a same material as that of a gate electrode of the transistor. The reflective layer includes a protrusion, a recess, or a level difference which is formed in accordance with a protrusion, a recess, or an aperture of the metal layer.

11 Claims, 24 Drawing Sheets

(56) References Cited

U.S. PATENT DOCUMENTS

| | | | |
|---|---|---|---|
| 5,408,345 A | 4/1995 | Mitsui et al. | |
| 5,418,635 A | 5/1995 | Mitsui et al. | |
| 5,508,834 A | 4/1996 | Yamada et al. | |
| 5,811,835 A | 9/1998 | Seiki et al. | |
| 6,104,460 A | 8/2000 | Abe et al. | |
| 6,154,264 A | 11/2000 | Koide et al. | |
| 6,208,395 B1 | 3/2001 | Kanoh et al. | |
| 6,287,899 B1 | 9/2001 | Park et al. | |
| 6,330,047 B1 | 12/2001 | Kubo et al. | |
| 6,407,784 B1 | 6/2002 | Kamou et al. | |
| 6,468,822 B2 | 10/2002 | Maeda et al. | |
| 6,573,127 B2 | 6/2003 | Seo | |
| 6,661,488 B1 | 12/2003 | Takeda et al. | |
| 6,710,825 B2 | 3/2004 | Kubo et al. | |
| 6,747,289 B2 | 6/2004 | Yamazaki et al. | |
| 6,771,346 B2 | 8/2004 | Sugimoto et al. | |
| 6,839,107 B2 | 1/2005 | Kobashi | |
| 6,839,108 B1 | 1/2005 | Hirakata et al. | |
| 6,873,384 B2 | 3/2005 | Yamanaka et al. | |
| 6,891,586 B2 | 5/2005 | Anno et al. | |
| 6,900,084 B1 | 5/2005 | Yamazaki | |
| 6,967,702 B2 | 11/2005 | Ishii et al. | |
| 6,992,718 B1 | 1/2006 | Takahara | |
| 7,102,712 B2 | 9/2006 | Anno et al. | |
| 7,375,781 B2 | 5/2008 | Kubo | |
| 7,420,635 B2 | 9/2008 | Ozawa | |
| 7,525,614 B2 | 4/2009 | Jeong et al. | |
| 7,538,846 B2 | 5/2009 | Yoshida et al. | |
| 7,554,631 B2 | 6/2009 | Tashiro et al. | |
| 7,639,327 B2 | 12/2009 | Ozawa | |
| 7,705,937 B2 | 4/2010 | Sakamoto et al. | |
| 7,768,603 B2 | 8/2010 | Tasaka et al. | |
| 2002/0018161 A1 | 2/2002 | Yamanaka et al. | |
| 2002/0022364 A1 | 2/2002 | Hatta et al. | |
| 2002/0054259 A1 | 5/2002 | Funahata et al. | |
| 2002/0054269 A1 | 5/2002 | Maeda et al. | |
| 2002/0080320 A1 | 6/2002 | Suzuki et al. | |
| 2002/0149728 A1 | 10/2002 | Ogishima et al. | |
| 2003/0089949 A1 | 5/2003 | Lin et al. | |
| 2003/0112213 A1 | 6/2003 | Noguchi et al. | |
| 2003/0123005 A1 | 7/2003 | Liu et al. | |
| 2003/0142255 A1 | 7/2003 | Ishii et al. | |
| 2003/0186478 A1 | 10/2003 | Morita et al. | |
| 2003/0218664 A1 | 11/2003 | Sakamoto et al. | |
| 2003/0231267 A1 | 12/2003 | Murai et al. | |
| 2004/0021810 A1 | 2/2004 | Kawaguri et al. | |
| 2004/0027702 A1 | 2/2004 | Matsushita et al. | |
| 2005/0122452 A1 | 6/2005 | Yoshida et al. | |
| 2005/0190322 A1 | 9/2005 | Okabe et al. | |
| 2005/0205870 A1 | 9/2005 | Yamazaki | |
| 2005/0270447 A1 | 12/2005 | Tasaka et al. | |
| 2006/0055852 A1 | 3/2006 | Yoshida et al. | |
| 2006/0256268 A1* | 11/2006 | Jeong et al. | 349/141 |
| 2007/0001171 A1 | 1/2007 | Yamazaki | |
| 2007/0146591 A1 | 6/2007 | Kimura et al. | |
| 2007/0291200 A1 | 12/2007 | Tashiro et al. | |
| 2008/0002079 A1 | 1/2008 | Kimura | |
| 2009/0185119 A1 | 7/2009 | Kikuchi | |
| 2009/0195740 A1 | 8/2009 | Imai | |
| 2010/0182527 A1 | 7/2010 | Kikuchi et al. | |
| 2010/0315578 A1 | 12/2010 | Hara et al. | |

FOREIGN PATENT DOCUMENTS

| | | |
|---|---|---|
| JP | 02-149802 | 6/1990 |
| JP | 4-372934 | 12/1992 |
| JP | 5-333328 | 12/1993 |
| JP | 6-331831 | 12/1994 |
| JP | 8-190089 | 7/1996 |
| JP | 9-54318 | 2/1997 |
| JP | 10-325953 | 12/1998 |
| JP | 11-109390 | 4/1999 |
| JP | 11-237625 A | 8/1999 |
| JP | 11-295697 | 10/1999 |
| JP | 11-337961 | 12/1999 |
| JP | 2000-010124 | 1/2000 |
| JP | 2000-208773 A | 7/2000 |
| JP | 2000-329906 | 11/2000 |
| JP | 2001-201619 | 7/2001 |
| JP | 2001-337323 | 12/2001 |
| JP | 2002-236283 | 8/2002 |
| JP | 2003-228062 | 8/2003 |
| JP | 2003-297850 | 10/2003 |
| JP | 2004-258366 | 9/2004 |
| JP | 2004-264653 | 9/2004 |
| JP | 2004-325503 | 11/2004 |
| JP | 2005-157105 A | 6/2005 |
| JP | 2005-195733 | 7/2005 |
| JP | 2005-208553 | 8/2005 |
| JP | 2005-313638 | 11/2005 |
| JP | 2006-098525 A | 4/2006 |
| JP | 2006-184673 | 7/2006 |
| JP | 2006-215287 | 8/2006 |
| JP | 2006-220711 | 8/2006 |
| JP | 2006-220922 | 8/2006 |
| JP | 2006-259134 | 9/2006 |
| JP | 2007-041572 | 2/2007 |
| JP | 2007-101843 | 4/2007 |
| JP | 2007-329099 | 12/2007 |
| JP | 2008-242307 A | 10/2008 |

OTHER PUBLICATIONS

U.S. Office Action mailed Dec. 27, 2011 in U.S. Appl. No. 12/524,914.
U.S. Final Office Action mailed Jan. 9, 2012 in U.S. Appl. No. 12/446,071.
English translation of the International Preliminary Report on Patentability mailed Aug. 13, 2009 in PCT Application No. PCT/JP2007/073787.
U.S. Notice of Allowance mailed Mar. 23, 2011 in U.S. Appl. No. 12/446,099.
International Search Report for PCT/JP2007/070160, mailed Nov. 27, 2007.
Supplementary EP Search Report mailed Sep. 23, 2010 in EP application 07806943.2.
U.S. Office Action mailed Aug. 3, 2011 in U.S. Appl. No. 12/446,071.
International Search Report for PCT/JP2007/067511, mailed Oct. 9, 2007.
International Search Report for PCT/JP2007/073557, mailed Jan. 15, 2008.
International Search Report for PCT/JP2007/070829, mailed Nov. 27, 2007.
English translation of the International Preliminary Report on Patentability mailed Jun. 25, 2009 in PCT Application No. PCT/JP2007/070829.
U.S. Office Action mailed Aug. 5, 2011 in U.S. Appl. No. 12/518,719.
Restriction Requirement mailed Jun. 2, 2011 in U.S. Appl. No. 12/518,719.
English translation of the International Preliminary Report on Patentability mailed Aug. 6, 2009 in PCT Application No. PCT/JP2007/073557.
International Search Report mailed Jan. 29, 2008 in PCT application PCT/JP/2007/073787.
English translation of International Preliminary Report on Patentability mailed Apr. 30, 2009 in corresponding PCT Application No. PCT/JP2007/070160.
English translation of International Preliminary Report on Patentability mailed Apr. 30, 2009 in corresponding PCT Application No. PCT/JP2007/067511.
English International Preliminary Report on Patentability mailed Jan. 21, 2010 in PCT Application No. PCT/JP2008/001353.
English International Preliminary Report on Patentability mailed Oct. 22, 2009 in PCT Application No. PCT/JP2007/075147.
Supplementary EP Search Report mailed Dec. 17, 2010 in EP application 07860369.3.
Supplementary EP Search Report mailed Mar. 3, 2010 in EP application 07850173.1.

(56) References Cited

OTHER PUBLICATIONS

English International Preliminary Report on Patentability mailed Nov. 27, 2008 in PCT Application No. PCT/JP2007/057674.
International Search Report mailed Jul. 8, 2008 in PCT application PCT/JP2008/001353.
International Search Report mailed Jul. 3, 2007 in PCT application PCT/JP2007/057674.
International Search Report mailed Jul. 3, 2007 in PCT application PCT/JP2007/057675.
English International Preliminary Report on Patentability mailed Nov. 27, 2008 in PCT Application No. PCT/JP2007/057675.
International Search Report for PCT/JP2007/075147, mailed Apr. 8, 2008.
U.S. Appl. No. 12/306,959, Hara, filed Dec. 30, 2008.
U.S. Appl. No. 12/446,071, Hara, filed Apr. 17, 2009.
U.S. Appl. No. 12/446,099, Imade, filed Apr. 17, 2009.
U.S. Appl. No. 12/518,719, Kikuchi, filed Jun. 11, 2009.
U.S. Appl. No. 12/523,935, Imai, filed Jul. 21, 2009.
U.S. Appl. No. 12/524,914, Shimada, filed Jul. 29, 2009.

\* cited by examiner (a)

(b)

(c)

(d)

(e)

(f)

(a)

(b)

(c)

(d)

(e)

(a)

(b)

(c)

(d)

(e)

(a)

(b)

(c)

(d)

(e)

(a)

(b)

(c)

(d)

(e)

(a)

(b)

(c)

(d)

(e)

(a)

(d)

(b)

(c)

(e)

(a)

(b)

US 8,659,726 B2

LIQUID CRYSTAL DISPLAY AND METHOD OF MANUFACTURING LIQUID CRYSTAL DISPLAY

This application is the U.S. national phase of International Application No. PCT/P2007/075147, filed 27 Dec. 2007, which designated the U.S. and claims priority to Japanese Patent Application No. 2007-105996, filed 13 Apr. 2007, the entire contents of each of which are hereby incorporated by reference.

TECHNICAL FIELD

The present invention relates to a reflection-type or transflective-type liquid crystal display device capable of performing display by utilizing reflected light.

BACKGROUND ART

Liquid crystal display devices (LCDs) include: the TN (Twisted Nematic) mode liquid crystal display device, in which a pixel electrode (picture element electrode) is provided on one of a pair of substrates (an upper substrate and a lower substrate) between which a liquid crystal layer is interposed, and a counter electrode on the other, such that displaying is performed by controlling the orientation of liquid crystal within a plane which is perpendicular to the substrate plane in accordance with an electric field occurring between both electrodes; and the FFS (Fringe-Field Switching) mode liquid crystal display device and the IPS (In-Plane Switching) mode liquid crystal display device, in which a pixel electrode and a counter electrode (lower electrode) are provided on one of a pair of opposing substrates, such that displaying is performed by controlling the orientation of liquid crystal within a plane which is substantially parallel to the substrate plane.

Moreover, liquid crystal display devices include: the transmission-type liquid crystal display device which utilizes backlight from behind the display panel as a light source for displaying; the reflection-type liquid crystal display device which utilizes reflected light of external light; and the transflective-type liquid crystal display device (reflection/transmission-type liquid crystal display device) which utilizes both reflected light of external light and backlight. The reflection-type liquid crystal display device and the transflective-type liquid crystal display device are characterized in that they have smaller power consumptions than that of the transmission-type liquid crystal display device, and their displayed images are easy to see in a bright place. The transflective-type liquid crystal display device is characterized in that its screen is easier to see than that of the reflection-type liquid crystal display device, even in a dark place.

FIG. 31 is a cross-sectional view showing the construction of a lower substrate 100 of a conventional FFS mode transflective-type liquid crystal display device which is described in Patent Document 1.

As shown in FIG. 31, the lower substrate 100 includes a TFT region, a transmission region, and a reflection region. In the TFT region, a gate electrode 103, an active layer 106, a source/drain electrode 107, and the like are formed on an organic resin film 101. In the transmission region and the reflection region, a counter electrode 102, a pixel electrode 105, and the like are formed. A plurality of slits are formed in the pixel electrode 105, such that the orientation of liquid crystal (not shown) which is disposed on the lower substrate 100 is controlled in accordance with a voltage or an electric field which is applied between electrode portions interposed between slits and the counter electrode 102.

Between the counter electrode 102 and the pixel electrode 105 in the reflection region, a reflector 109 for reflecting incident light is provided. In the transmission region, the counter electrode 102 is provided in contact with the substrate 110; however, in the reflection region, the counter electrode 102 is formed on the organic resin film 101 disposed on the substrate 110. An emboss pattern is formed by etching on an upper face of the organic resin film 101 in the reflection region, and a plurality of protrusions (or recesses) are formed on the counter electrode 102 so as to conform to the shape of this upper face.

[Patent Document 1] Japanese Laid-Open Patent Publication No. 2006-317905

DISCLOSURE OF INVENTION

Problems to be Solved by the Invention

In the reflection-type liquid crystal display device or the transflective-type liquid crystal display device, in order to perform bright displaying by utilizing reflected light, it is necessary to allow incident light entering at various azimuths to be more uniformly and efficiently reflected by the reflection surface of the reflective layer across the entire display surface. For this purpose, it is better if the reflection surface has moderate ruggednesses rather than being a complete plane.

FIG. 32 is a diagram showing a relationship between the tilt of a reflection surface and reflected light. FIG. 32(a) shows a relationship between an incident angle $\alpha$ and an outgoing angle $\beta$ when light enters a medium b having a refractive index Nb from a medium a having a refractive index Na. In this case, according to Snell's Law, the following relationship holds true.

$$Na^* \sin \alpha = Nb^* \sin \beta$$

FIG. 32(b) is a diagram showing a relationship between incident light and reflected light when incident light perpendicularly entering the display surface of a liquid crystal display device is reflected from a reflection surface which is tilted by $\theta$ with respect to the display surface (or the substrate). As shown in the figure, the incident light perpendicularly entering the display surface is reflected from the reflection surface which is tilted by angle $\theta$ with respect to the display surface, and goes out in a direction of an outgoing angle $\phi$.

Results of calculating the outgoing angle $\phi$ according to Snell's Law with respect to each angle $\theta$ of the reflection surface are shown in Table 1.

TABLE 1

| $\theta$ | $\phi$ | 90 − $\phi$ |
|---|---|---|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle $\theta$ of the reflection surface exceeds 20 degrees, the outgoing angle φ becomes very large (i.e., 90-φ becomes very small), so that most of the outgoing light does not reach the user. Therefore, even if ruggednesses are provided on the reflection surface of the reflective layer, in order to effectively utilize reflected light, it must be ensured in more portions of the reflection surface that the angle θ is 20 degrees or less.

In FIG. 31, it is described that, in the reflection region of the lower substrate 100, ruggednesses are formed on the counter electrode 102 in accordance with the emboss pattern which is provided on the surface of the organic resin film 101, but no consideration is given as to adjusting the tilting angle of the reflector 109 in order to efficiently utilize reflected light, or ensuring that the tilt of the surface of the reflector 109 is 20 degrees or less.

In order to impart a desired tilting angle to the reflection surface, as described above, it might be conceivable to form an emboss pattern on the surface of the organic resin film 101, and form desired ruggednesses on the reflection surface so as to conform to that emboss pattern. However, in this case, a step of forming the organic resin film 101, a step of forming a mask on the organic resin film 101, a step of performing an etching treatment for the organic resin film 101 via the mask, a step of removing the mask, and the like are needed, thus resulting in a problem in that the amount of the materials and the number of steps are increased.

The present invention has been made in view of the above problems, and an objective thereof is to provide with a good production efficiency a reflection-type liquid crystal display device and a transflective-type liquid crystal display device having a high image quality and being capable of efficiently utilizing reflected light.

Means for Solving the Problems

A liquid crystal display device according to the present invention is a liquid crystal display device comprising: a first substrate and a second substrate between which liquid crystal is interposed; a first electrode and a second electrode formed on the first substrate for applying a voltage for controlling an orientation of the liquid crystal; a transistor having an electrode which is electrically connected to the first electrode; a metal layer formed on the first substrate, the metal layer including a protrusion, a recess, or an aperture; and a reflective layer formed above the metal layer in the first substrate, the reflective layer reflecting incident light toward a display surface, wherein, the metal layer is made of a same material as that of a gate electrode of the transistor; and the reflective layer includes a protrusion, a recess, or a level difference which is formed in accordance with the protrusion, recess, or aperture of the metal layer.

In one embodiment, the second electrode includes a protrusion, a recess, or an aperture; and the reflective layer includes a protrusion, a recess, or a level difference which is formed in accordance with the protrusion, recess, or aperture of the second electrode.

One embodiment comprises, under the reflective layer, a semiconductor layer made of a same material as a semiconductor portion of the transistor, the semiconductor layer including a protrusion, a recess, or an aperture, wherein, the reflective layer includes a protrusion, a recess, or a level difference which is formed in accordance with the protrusion, recess, or aperture of the semiconductor layer.

In one embodiment, the reflective layer is made of a same material as that of a source electrode or a drain electrode of the transistor.

In one embodiment, an insulating layer is formed between the metal layer and the second electrode; and a contact hole electrically connecting the metal layer and the second electrode is formed in the insulating layer.

In one embodiment, the reflective layer includes an aperture.

In one embodiment, the second electrode is formed over the metal layer, and includes a protrusion, a recess, or a level difference which is formed in accordance with the protrusion, recess, or aperture of the metal layer.

In one embodiment, the second electrode is formed under the metal layer, and includes a protrusion, a recess, or an aperture; and the metal layer includes a protrusion, a recess, or a level difference which is formed in accordance with the protrusion, recess, or aperture of the second electrode.

In one embodiment, the first electrode is a pixel electrode, and the second electrode is a counter electrode formed under the first electrode.

In one embodiment, the first electrode is a pixel electrode, and the second electrode is a counter electrode formed on a same plane as the first electrode.

Another liquid crystal display device according to the present invention is a liquid crystal display device comprising: a first substrate and a second substrate between which liquid crystal is interposed; a first electrode and a second electrode formed on the first substrate for applying a voltage for controlling an orientation of the liquid crystal; a transistor having an electrode which is electrically connected to the first electrode; a metal layer formed on the first substrate for reflecting incident light toward a display surface, the metal layer including a protrusion, a recess, or an aperture, wherein, the metal layer is made of a same material as that of a gate electrode of the transistor.

In one embodiment, the first electrode is a pixel electrode; and the second electrode is a counter electrode formed over the metal layer.

In one embodiment, the first electrode is a pixel electrode; the second electrode is a counter electrode being formed under the metal layer and including a protrusion, a recess, or an aperture; and the metal layer includes a protrusion, a recess, or a level difference which is formed in accordance with the protrusion, recess, or aperture of the second electrode.

In one embodiment, the first electrode is a pixel electrode, and the second electrode is a counter electrode formed on a same plane as the first electrode.

Another liquid crystal display device according to the present invention is a liquid crystal display device having: a reflection region including a reflective layer for reflecting incident light toward a display surface; and a TFT region, the liquid crystal display device comprising: a first substrate and a second substrate between which liquid crystal is interposed; a first electrode and a second electrode formed on the first substrate for applying a voltage for controlling an orientation of the liquid crystal; and a transistor being formed in the TFT region and having a gate layer, a semiconductor layer, a source electrode, and a drain electrode, wherein, in the reflection region, a layer is formed which is made of a same material as that of the gate layer, the semiconductor layer, the source electrode, or the drain electrode of the transistor, the layer including a protrusion, a recess, or an aperture.

In one embodiment, the reflective layer is made of a same material as that of the gate layer, the source electrode, or the drain electrode of the transistor, and includes a protrusion, a recess, an aperture, or a level difference.

A production method for a liquid crystal display device according to the present invention is a production method for a liquid crystal display device including a first substrate and a second substrate between which liquid crystal is interposed and a first electrode and a second electrode for applying a voltage for controlling an orientation of the liquid crystal, the liquid crystal display device having: a reflection region including a reflective layer for reflecting incident light toward a display surface; and a TFT region, the production method comprising the steps of: (a) forming a gate layer in the TFT region; (b) forming a semiconductor layer above the gate layer in the TFT region; and (c) forming a source electrode and a drain electrode above the semiconductor layer in the TFT region, wherein, at step (a), a first metal layer including a protrusion, a recess, or an aperture is formed in the reflection region, from a same material as that of the gate layer of the TFT region, or at step (c), a second metal layer including a protrusion, a recess, or an aperture is formed in the reflection region, from a same material as that of the source electrode or drain electrode in the TFT region.

In one embodiment, the first metal layer or the second metal layer constitutes the reflective layer.

In one embodiment, at step (b), in the reflection region, a semiconductor layer including a protrusion, a recess, or an aperture is formed from a same material as that of the semiconductor layer in the TFT region.

In one embodiment, at step (c), in the second metal layer, a protrusion, a recess, or a level difference which is in accordance with the protrusion, recess, or aperture of the first metal layer is formed.

Effects of the Invention

According to the present invention, in a reflection region of a liquid crystal display device, a layer which is made of the same material as that of a layer composing a transistor or, or a layer which is stacked in the same step as that of a layer composing a transistor is formed, and in accordance with the shape of this layer, a protrusion, a recess, or a level difference is formed in a reflective layer (including any layer having the function as a reflective layer). Therefore, a reflection-type liquid crystal display device and a transflective-type liquid crystal display device having a high image quality and being capable of efficiently utilizing reflected light can be provided with a good production efficiency.

DESCRIPTION OF REFERENCE NUMERALS

Figure 1:
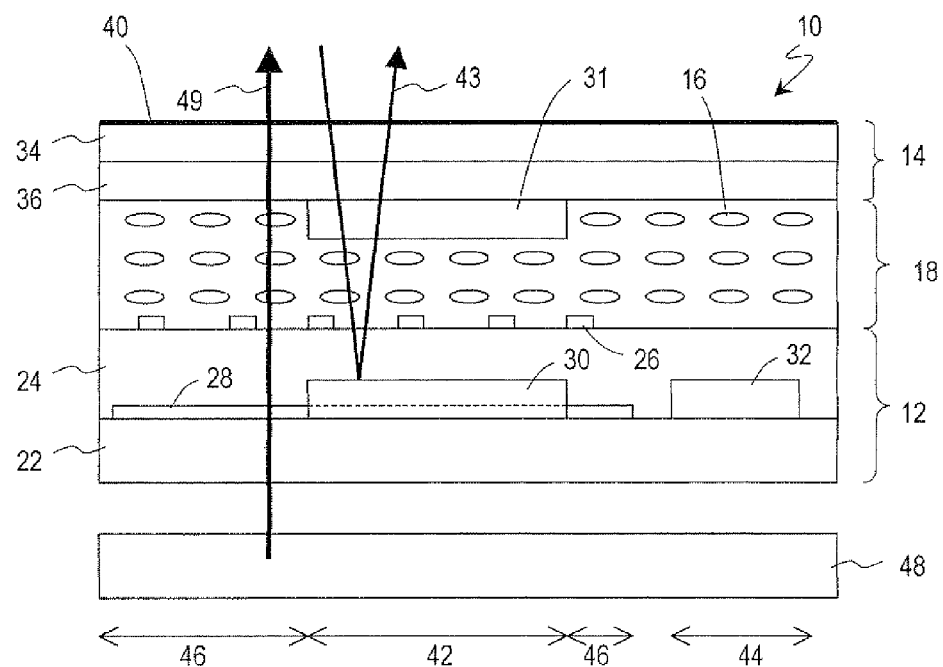
FIG. 1 A diagram schematically showing a cross-sectional shape of a liquid crystal display device of Embodiment 1.

10 quid crystal display device
12 TFT substrate 14 counter substrate
16 liquid crystal
18 liquid crystal layer
22 transparent substrate
24 interlayer insulating layer
26 pixel electrode
28, 28' counter electrode
30 reflection section
31 adjustment layer
32 TFT section
34 transparent substrate
36 CF layer
40 display surface
42 reflection region
43 reflected light
44 TFT region
46 transmission region
48 light source
49 transmitted light
50 pixel
52 source line
54 gate line (gate electrode)
56 Cs line (Cs metal layer)
58 insulating layer
60 TFT
61 reflective layer
62 semiconductor layer
63 source electrode
64 drain electrode
65, 65' contact hole
70, 71 aperture
70' recess
75 contact hole
80, 81 recess
82 protrusion
83 level difference
85 recess
87 aperture
100 lower substrate
101 organic resin film
102 counter electrode
103 gate electrode
105 pixel electrode
106 active layer
107 source/drain electrode
109 reflector
110 substrate

BEST MODE FOR CARRYING OUT THE INVENTION

Embodiment 1

Hereinafter, with reference to the drawings, a first embodiment of the liquid crystal display device according to the present invention will be described.

FIG. 1 is a diagram schematically showing a cross-sectional shape of a liquid crystal display device 10 of the present embodiment, which is a cross-sectional view showing the construction of one pixel among a plurality of pixels which are disposed in a matrix shape in the liquid crystal display device 10.

The liquid crystal display device 10 of the present embodiment is an FFS mode transflective-type liquid crystal display device adopting an active matrix method. As shown in FIG. 1, the liquid crystal display device 10 includes a TFT (Thin Film Transistor) substrate (first substrate) 12, a counter substrate (second substrate) 14 including color filters (CEs) and the like, and a liquid crystal layer 18 containing liquid crystal 16 which is sealed between the TFT substrate 12 and the counter substrate 14.

The TFT substrate 12 includes a transparent substrate 22, an interlayer insulating layer (PAS) 24, a pixel electrode (first electrode) 26, and a counter electrode (common electrode or lower electrode) 28 disposed below the pixel electrode 26, and has a reflection section 30 and a TFT section 32. The pixel electrode 26 is electrically connected to a drain electrode of a TFT which is formed in the TFT section 32, and as a voltage or electric field is applied to the liquid crystal 16 by the pixel electrode 26 and the counter electrode 28, the orientation of the liquid crystal 16 is controlled with respect to each pixel, thereby performing display. Although not shown herein, gate lines (scanning lines), source Lines (signal lines), and Cs lines (storage capacitor electrode lines) are also provided on the TFT substrate 12.

The counter substrate 14 includes a transparent substrate 34, a CF layer (color filter layer) 36, and the like. The upper face of the transparent substrate 34 serves as a display surface 40 of the liquid crystal display device. Although the TFT substrate 12 and the counter substrate 14 each include optical film layers such as an alignment film and a polarizer, those are omitted from illustration herein.

In the liquid crystal display device 10, a region where the reflection section 30 is formed is referred to as a reflection region 42, whereas a region where the TFT section 32 is formed is referred to as a TFT region 44. In the reflection region 42, light entering from the display surface 40 is reflected by the reflective layer in the reflection section 30, and travels through the liquid crystal layer 18 and the counter substrate 14 so as to go out from the display surface 40 as reflected light 43. Furthermore, the liquid crystal display device 10 has transmission regions 46 which are formed in regions other than the reflection regions 42 and the TFT regions 44. In the transmission regions 46, light which is emitted from a light source 48 in the liquid crystal display device 10 travels through the TFT substrate 12, the liquid crystal layer 18, and the counter substrate 14 so as to go out from the display surface 40 as transmitted light 49.

Note that, by providing an adjustment layer 31 made of transmissive resin or the like on the lower face of the counter substrate 14 over the reflection section 30 as shown in FIG. 1, it becomes possible to reduce the thickness of the liquid crystal layer 18 in the reflection region 42 to substantially a half of the thickness of the liquid crystal layer 18 in the transmission region 46. As a result, the optical path lengths of the reflected light 43 and the transmitted light 49 in the liquid crystal layer 18 can be made equal.

Next, the construction of the TFT substrate 12 will be described in more detail with reference to FIG. 2 to FIG. 4.

Figure 2:
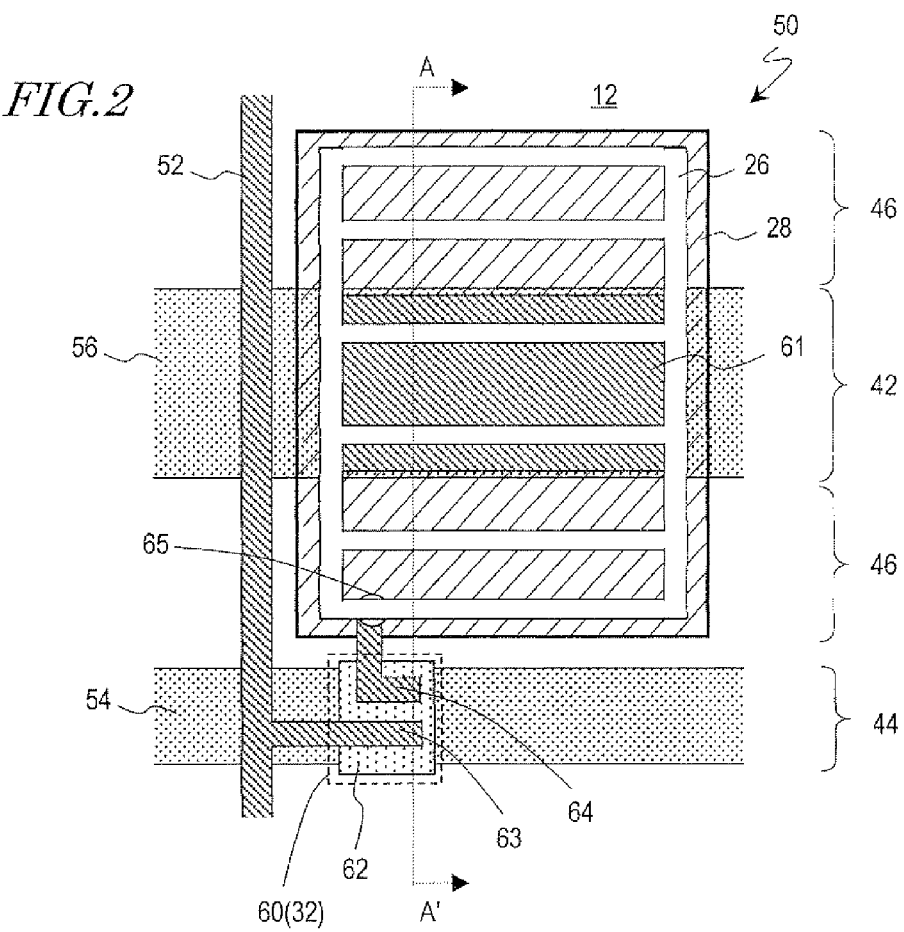
FIG. 2 A plan view schematically showing the construction of a TFT substrate of the liquid crystal display device of Embodiment 1.

FIG. 2 is a plan view schematically showing the construction of the TFT substrate 12 in one pixel among the plurality of pixels which are disposed in a matrix shape in the liquid crystal display device 10.

As shown in the figure, a pixel 50 includes the reflection region 42, the TFT region 44, and the transmission region 46 mentioned above. In the border of the pixel 50, source lines 52 extend along the column direction (up-down direction in the figure) of the plurality of pixels disposed in a matrix shape, and gate lines (gate metal layers) 54 extend along the row direction (right-left direction in the figure). In the central portion of the pixel 50, a Cs line (also referred to as a metal layer or a Cs metal layer) 56 extends along the row direction.

A TFT 60 is formed in the TFT section 32 of the TFT region 44, whereas the counter electrode 28, the pixel electrode 26, and the like are formed in the transmission region 46. In the reflection region 42, the Cs line 56, the counter electrode 28, the reflective layer 61, the pixel electrode 26, and the like, which are the elements of the reflection section 30 as shown in FIG. 1, are formed.

Figure 3:
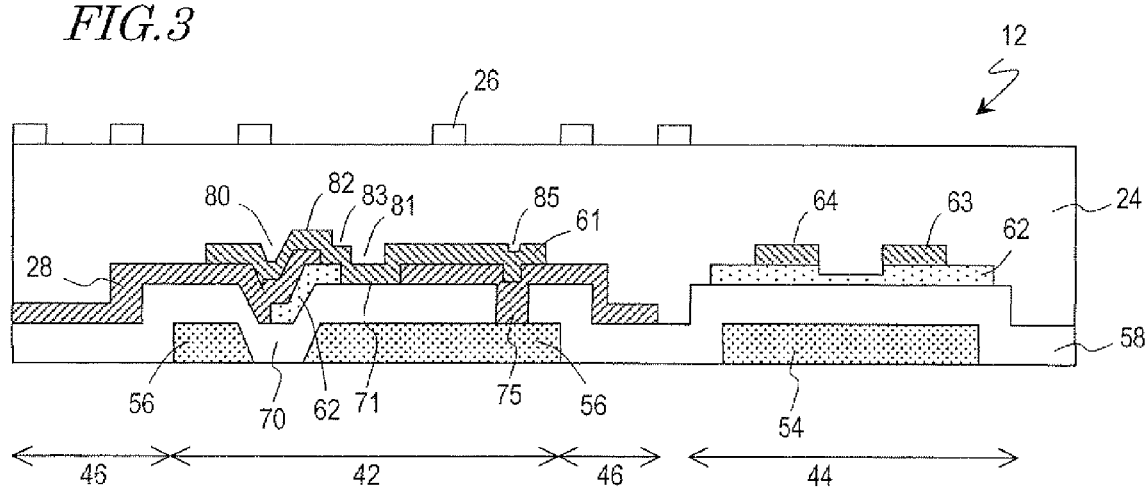
FIG. 3 A diagram schematically showing a cross-sectional structure of the TFT substrate of the liquid crystal display device of Embodiment 1.

FIG. 3 is a cross-sectional view schematically showing an A-A' cross section of the TFT substrate 12 shown in FIG. 2.

As shown in FIG. 3, in the TFT section 32 of the TFT substrate 12, an insulating layer 58 is formed on the gate line (gate electrode) 54, and a semiconductor layer 62 is formed on the insulating layer 58. Note that a portion of the gate line 54 that is located in the TFT section 32 is referred to as the gate electrode 54 herein. The semiconductor layer 62 is composed of an intrinsic amorphous silicon layer (Si(i)layer) and an $n^+$ amorphous silicon layer (Si($n^+$)layer) doped with phosphorus, for example. A source electrode 63 and a drain electrode 64 are formed on the semiconductor layer 62, such that, as shown in FIG. 2, the source electrode 63 is electrically connected to the source line 52, whereas the drain electrode 64 is electrically connected to the pixel electrode 26 via a contact hole 65 formed in the interlayer insulating layer 24.

In the reflection region 42, the Cs metal layer (also referred to as metal layer or Cs line) 56 is formed from the same member as the gate line (gate electrode) 54. On the Cs metal layer 56, the insulating layer 58, the counter electrode 28, the semiconductor layer 62, the reflective layer 61, the interlayer insulating layer 24, and the pixel electrode 26 are stacked. Note that the Cs metal layer 56 is formed concurrently with and from the same member as the gate electrode 54 of the TFT 60; the semiconductor layer 62 as the semiconductor layer 62 of the TFT 60; and the reflective layer 61 as the source electrode 63 and drain electrode 64 of the TFT 60.

The Cs metal layer 56 has apertures 70, the counter electrode 28 has apertures 71, and the semiconductor layer 62 is formed in an island shape from above an aperture 70 to inside the aperture 71. In the reflective layer 61, recesses 80, recesses 81, and protrusions 82 are formed so as to conform to the shapes of the apertures 70, the apertures 71, and the semiconductor layer 62, respectively. Because the semiconductor layer 62 is formed inside the apertures 71, level differences 83 are formed in the reflective layer 61. A contact hole 75 is formed in the insulating layer 58, such that the counter electrode 28 is electrically connected to the Cs metal layer 56 via the contact hole 75.

Note that, instead of the apertures 70 or in addition to the apertures 70, protrusions or recesses (dents) may be formed on or in the Cs metal layer 56, and the Cs metal layer 56 may be formed in island shapes (it is assumed that each island portion of the Cs metal layer 56 also qualifies as "a protrusion of the Cs metal layer 56"). Moreover, instead of the apertures 71 or in addition to the apertures 71, protrusions or recesses (dents) may be formed on or in the counter electrode 28, and the counter electrode 28 may be formed in island shapes (it is assumed that each island portion of the counter electrode 28 qualifies as a "protrusion of the counter electrode 28"). Furthermore, the semiconductor layer 62 may be formed as a layer having apertures, protrusions, or recesses. In either case, protrusions, recesses, or level differences are formed on or in the reflective layer 61 in accordance with the protrusions, recesses, and apertures of the Cs metal layer 56, the counter electrode 28, and the semiconductor layer 62.

Figure 4:
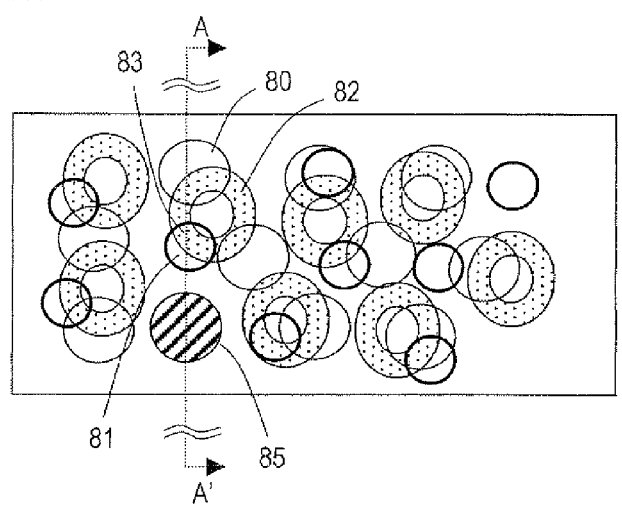
FIG. 4 A plan view schematically showing the shape of a reflective layer of the TFT substrate of Embodiment 1.

FIG. 4 is a diagram schematically showing the shape of the reflective layer 61 as viewed from the display surface 40 side.

As shown in the figure, the recesses 80 which are formed in accordance with the apertures 70 in the Cs metal layer 56, the recesses 81 which are formed in accordance with the apertures 71 in the counter electrode 28, the protrusions 82 which are formed in accordance with the protrusions of the semiconductor layer 62 (island shapes of the semiconductor layer 62), and the recesse 85 which is formed in accordance with the contact hole 75 in the insulating layer 58 are formed in the reflective layer 61. Moreover, a level difference 83 is formed at each portion where a recess 81 and a protrusion 82 overlap.

Although about eight to ten each of the recesses 80, recesses 81, and protrusions 82 are illustrated for ease of understanding the construction, the numbers of the recesses 80, recesses 81, and protrusions 82 are not limited to the illustrated numbers; more of them may be formed.

According to the present invention, a plurality of recesses, protrusions, or level differences (hereinafter also referred to as recesses or the like) as mentioned above are formed in or on the reflective layer 61. Since the corner portions and slopes of such recesses or the like include many faces whose angles with respect to the substrate are 20 degrees or less (effective reflection surfaces), reflected light can be effectively utilized. Moreover, since a multitude of faces having respectively different tilting angles are formed in the corner portions of the recesses or the like, reflected light is prevented from heading only in a fixed direction. Therefore, by forming more recesses or the like, it becomes possible to obtain reflected light which expands in a broader range.

Moreover, since the reflective layer 61 is formed so as to conform to the shapes of the plurality of layers which are located below the reflective layer 61, more recesses or the like can be easily formed in the reflective layer 61, and shapes can be easily formed in which a plurality of recesses or the like overlap. Therefore, more effective reflection surfaces can be easily formed on the surface of the reflective layer 61.

Furthermore, according to the present invention, since the reflective layer 61 is formed so as to conform to the shapes of a layer which are formed concurrently with and from the same material of a layer composing the TFT 60, there is no need to separately add a stacking step, a photolithography step, or the like in order to form the recesses or the like. Therefore, it is possible to provide a liquid crystal display device having a good reflection efficiency with a good production efficiency and at low cost. Moreover, since the shapes, depths, and slope tilting angles of the recesses or the like can be easily adjusted when shaping the respective layers composing the TFT 60, more effective reflection surfaces can be easily formed on the surface of the reflective layer 61.

Next, with reference to FIG. 5 and FIG. 6, a production method for the TFT substrate 12 of Embodiment 1 will be described.

Figure 5:
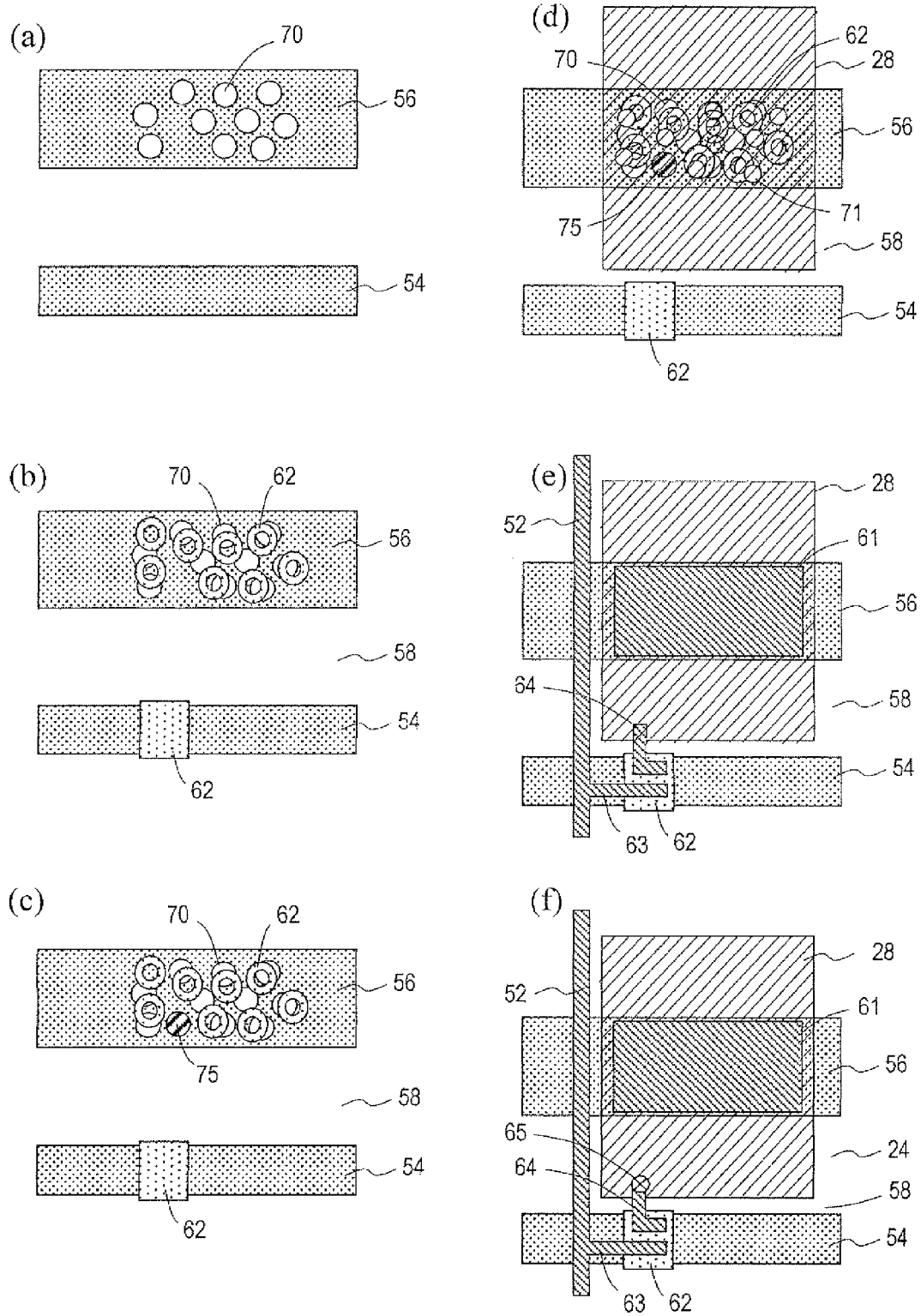
FIG. 5 Plan views showing a production method for the TFT substrate of Embodiment 1.

FIG. 5 is plan views showing a production method for the TFT substrate 12, schematically showing the production steps of the portion illustrated in FIG. 2. FIG. 6 is cross-sectional views for describing the production method for the TFT substrate 12, schematically showing the production steps of the portion illustrated in FIG. 3.

As shown in FIG. 5(a) and FIG. 6(a), first, by a method such as sputtering, a thin metal film of Ta (tantalum) is formed on the transparent substrate having been cleaned. Other than Ta, this thin metal film may be formed by using Al (aluminum), Ti (titanium), Cr (chromium), Mo (molybdenum), W (tungsten), or an alloy thereof, etc., or formed from a multilayer body of a layer of such materials and a nitride film.

Thereafter, a resist film is formed on the thin metal film, and after forming a resist pattern through an exposure-development step, a dry etching is performed to form the gate electrode 54 and the Cs metal layer (first metal layer) 56. The thickness of the gate electrode 54 is 50 to 1000 nm, for example. Note that wet etching may be employed as the etching. At this time, a plurality of apertures 70 are formed in the Cs metal layer 56. In the case of forming the apertures 70, it is possible to adjust the tilting angle of the side face of each aperture 70 by using halftone exposure. Moreover, recesses (dents) may be formed instead of the apertures 70. In this step, the gate line 54 and the Cs line 56 shown in FIG. 2 are also formed concurrently from the same metal.

Figure 6:
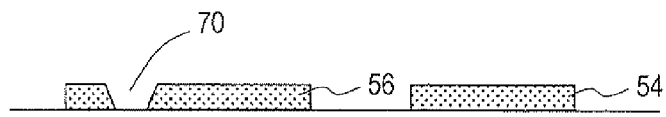
FIG. 6 Cross-sectional views showing the production method for the TFT substrate of Embodiment 1.
Figure 6:
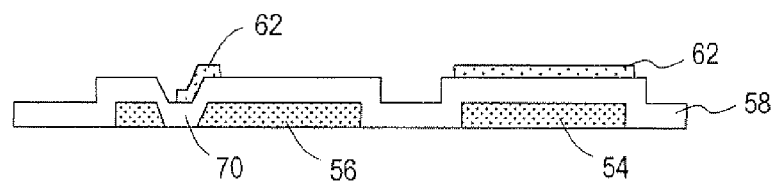
Figure 6:
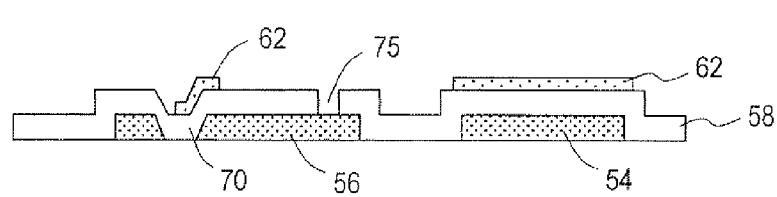
Figure 6:
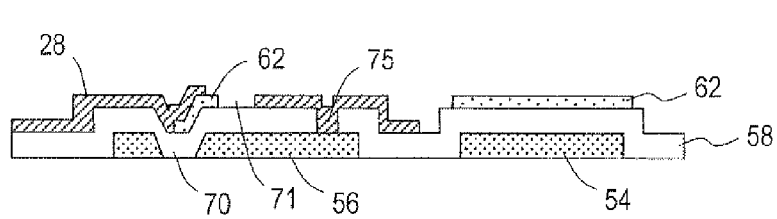
Figure 6:
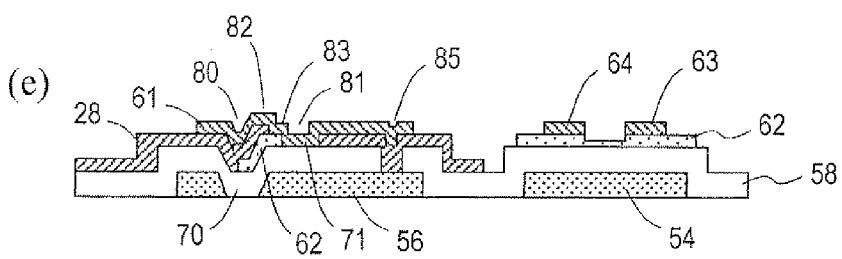
Figure 6:
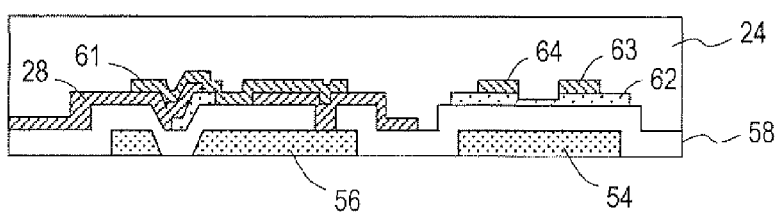

Next, as shown in FIG. 5(*b*) and FIG. 6(*b*), by using a P-CVD technique and a gaseous mixture of $SiH_4$, $NH_3$, and $N_2$, the insulating layer 58 composed of SiN (silicon nitride) is formed on the entire substrate surface. The insulating layer 58 may also be composed of $SiO_2$ (silicon oxide), $Ta_2O_5$ (tantalum oxide), $Al_2O_3$ (aluminum oxide), or the like. The thickness of the insulating layer 58 is 100 to 600 nm, for example.

Next, on the insulating layer 58, an intrinsic amorphous silicon (a-Si) film (Si(i) film) and an $n^+$ a-Si film (Si($n^+$) film) obtained by doping amorphous silicon with phosphorus (P) are formed. The thickness of the a-Si film is 20 to 300 nm, for example, and the thickness of the $n^+$ a-Si film is 20 to 100 nm, for example. Thereafter, these films are shaped by photolithography technique, whereby the semiconductor layer 62 is formed. Here, above the Cs metal layer 56, a plurality of annular shapes of semiconductor layer 62 are formed in island shapes, at positions overlapping the apertures 70 in the Cs metal layer 56.

Next, as shown in FIG. 5(*c*) and FIG. 6(*c*), the contact hole 75 reaching the Cs metal layer 56 is formed in the insulating layer 58 by photolithography technique.

Next, as shown in FIG. 5(*d*) and FIG. 6(*d*), a transparent electrode film of ITO, IZO, or the like is formed on the insulating layer 58 and the semiconductor layer 62 by sputtering technique or the like, and the resultant transparent electrode film is pattern-shaped by photolithography technique, whereby the counter electrode 28 is formed in the reflection region 42 and the transmission region 46. At this time, a plurality of apertures 71 are formed in the counter electrode 28. At least some of the plurality of apertures 71 are formed in positions overlapping the apertures 70 in the Cs metal layer 56 and the semiconductor layer 62, whereby recesses, protrusions, and level differences are formed on the surface of the counter electrode 28. A recess in accordance with the contact hole 75 is also formed in the counter electrode 28.

Next, as shown in FIG. 5(*e*) and FIG. 6(*e*), a thin metal film of Al or the like is formed on the entire substrate surface by sputtering technique or the like, and a photolithography technique is employed to form the source electrode 63, the source line 52, the drain electrode 64, and the reflective layer (second metal layer) 61. At this time, in the reflective layer 61, the recesses 80, the recesses 81, the protrusions 82, the level differences 83, and the recess 85 are formed, which conform to the shapes of the apertures 70 in the Cs metal layer 56, the semiconductor layer 62, the contact holes 75 in the insulating layer 58, and the apertures 71 in the counter electrode 28. Note that, as the thin metal film, the materials listed above as the materials for the gate electrode 54 can be used. The thickness of the reflective layer 61 is 30 to 1000 nm, for example.

Next, as shown in FIG. 5(*f*) and FIG. 6(*f*), a photosensitive acrylic resin is applied onto the substrate by spin-coating, whereby the interlayer insulating layer 24 is formed. The thickness of the interlayer insulating layer 24 is 0.3 to 5 μm, for example. Although omitted from illustration herein, the contact hole 65 is formed in the interlayer insulating layer 24 over the drain electrode 64. Although a thin film of $SiN_x$, $SiO_2$, or the like may be formed by P-CVD technique as a protection layer under the interlayer insulating layer 24, such is omitted from illustration herein. The thickness of the protection film is 50 to 1000 nm, for example.

Finally, the pixel electrode 26 is formed on the interlayer insulating layer 24, whereby the TFT substrate 12 shown in FIG. 2 and FIG. 3 is completed. The pixel electrode 26 is obtained by stacking a transparent electrode film of ITO, IZO, or the like by sputtering technique or the like, and pattern-shaping the stacked transparent electrode film by photolithography technique. The pixel electrode 26 and the drain electrode 64 are electrically connected via the contact hole 65.

Preferably, as many recesses 80, recesses 81, protrusions 82, level differences 83, and recesses 85 as possible are formed. Therefore, it is preferable that as many apertures 70 in the Cs metal layer 56, island shapes of semiconductor layer 62, and apertures 71 in the counter electrode 28 as possible are formed on the reflection surface, within the limitations of the masks and photoexposure during the production steps. The preferable sizes of the apertures 70, the apertures 71, and the island shapes of semiconductor layer 62, are defined by diameters of 2 to 10 μm.

Embodiment 2

Next, with reference to FIGS. 7 to 10, a second embodiment of the liquid crystal display device according to the present invention will be described. The liquid crystal display device of the present embodiment differs from the Embodiment 1 only with respect to a portion of the construction of the TFT substrate 12, and is identical to Embodiment 1 including the production method, effects, and the like, except for what is described below. Constituent elements which are identical to those of Embodiment 1 will be denoted by like reference numerals, and detailed descriptions thereof will be omitted.

Figure 7:
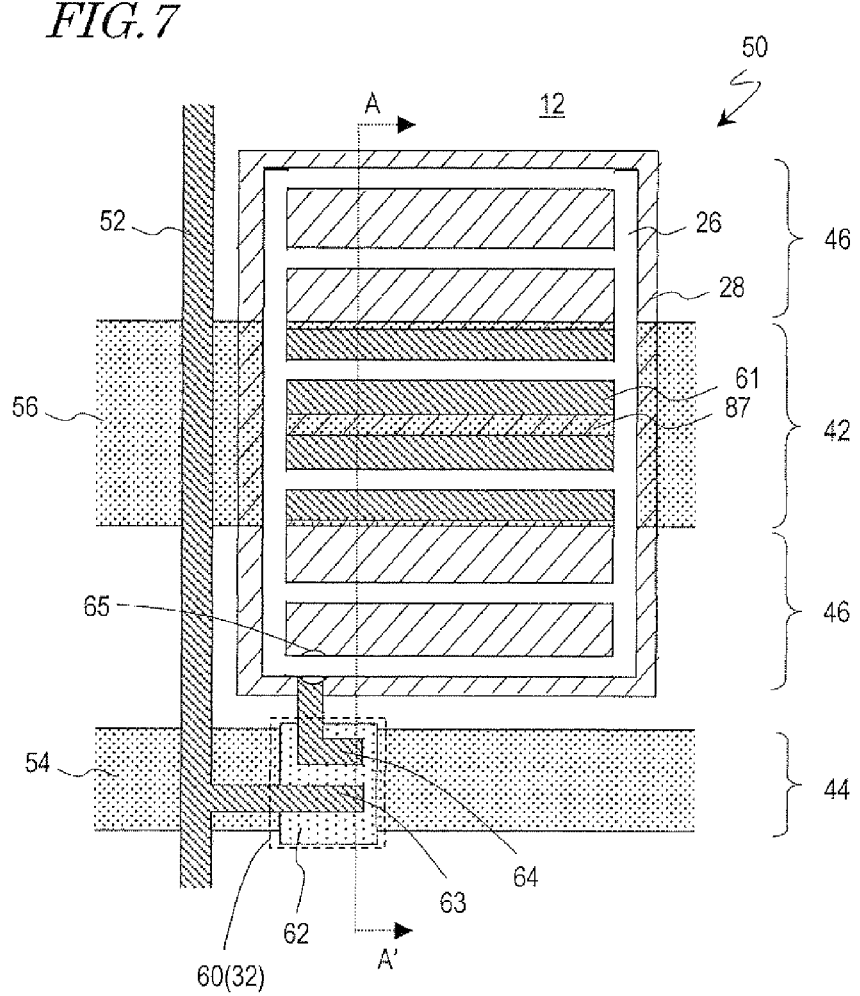
FIG. 7 A plan view schematically showing the construction of a TFT substrate of a liquid crystal display device of Embodiment 2.
Figure 8:
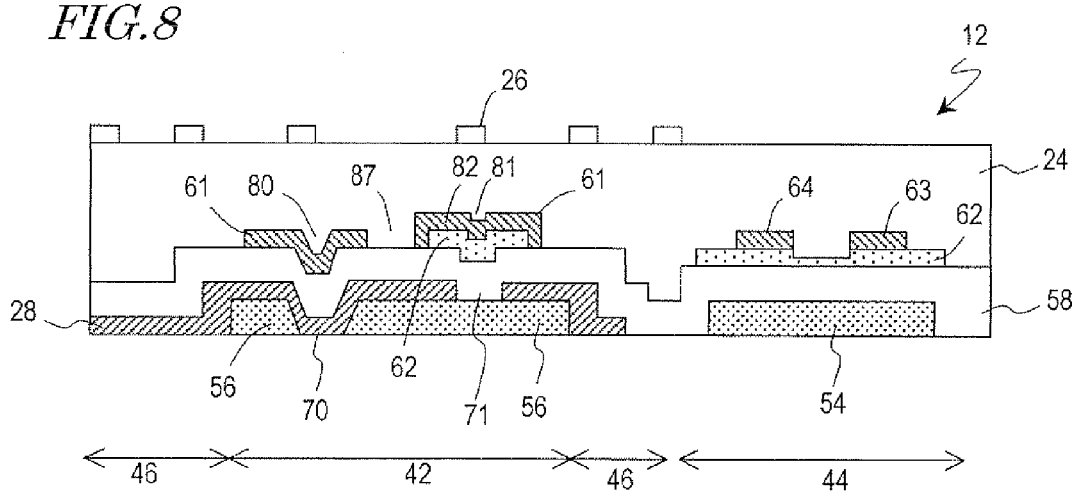
FIG. 8 A diagram schematically showing a cross-sectional structure of the TFT substrate of the liquid crystal display device of Embodiment 2.

FIG. 7 is a plan view schematically showing the construction of the TFT substrate 12 corresponding to one pixel 50 of the liquid crystal display device 10 shown in FIG. 1. FIG. 8 is a cross-sectional view schematically showing an A-A' cross section of the TFT substrate 12 shown in FIG. 7.

As shown in FIG. 7 and FIG. 8, in the reflection region 42 of the TFT substrate 12 of Embodiment 2, the counter electrode 28 is stacked on the Cs metal layer 56 so as to be in contact with the Cs metal layer 56. On the counter electrode 28, the insulating layer 58, the semiconductor layer 62, and the reflective layer 61 are stacked in this order. An aperture (gap or slit) 87 is formed in the reflective Layer 61, such that the reflective layer 61 is divided into two portions because of the aperture 87.

As shown in FIG. 8, recesses 80 conforming to the apertures 70 in the Cs metal layer 56, recesses 81 conforming to the apertures 71 in the counter electrode 28, and protrusions 82 conforming to the island shapes of semiconductor layer 62 are formed in the reflective layer 61. The aperture 87 is formed also in the reflective layer 61 itself. This makes it possible to form a multitude of corner portions on the surface of the reflective layer 61. Note that a recess or protrusion may be formed instead of the aperture 87 in the reflective layer 61.

Next, with reference to FIG. 9 and FIG. 10, a production method for the TFT substrate 12 of Embodiment 2 will be described.

Figure 9:
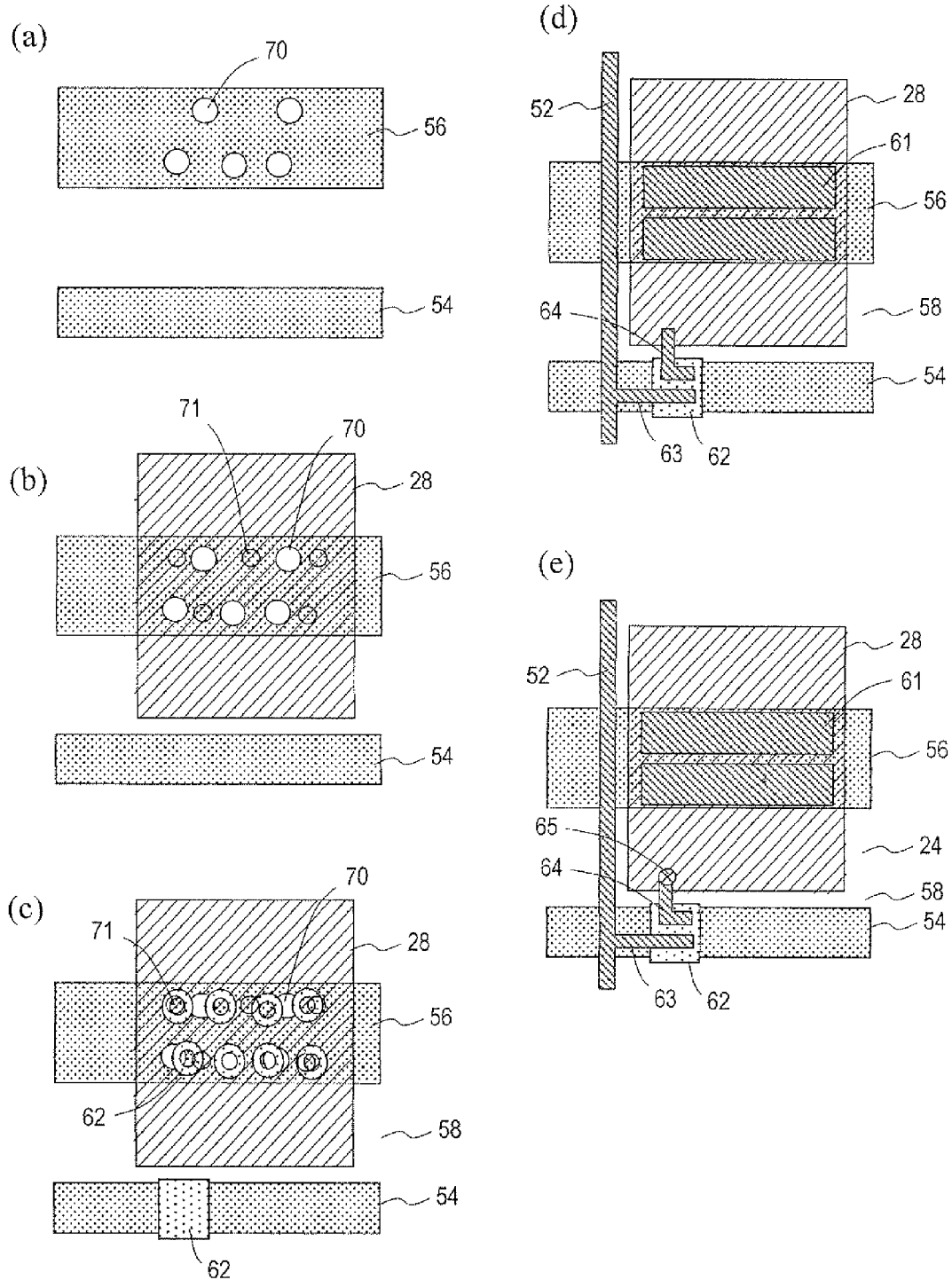
FIG. 9 Plan views showing a production method for the TFT substrate of Embodiment 2.
Figure 10:
FIG. 10 Cross-sectional views showing the product-on method for the TFT substrate of Embodiment 2.
Figure 10:
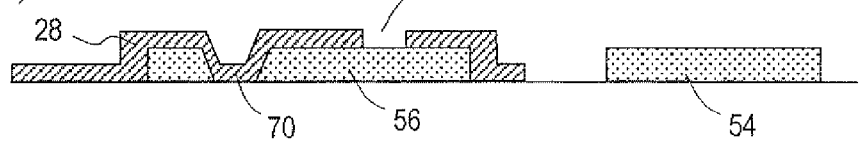
Figure 10:
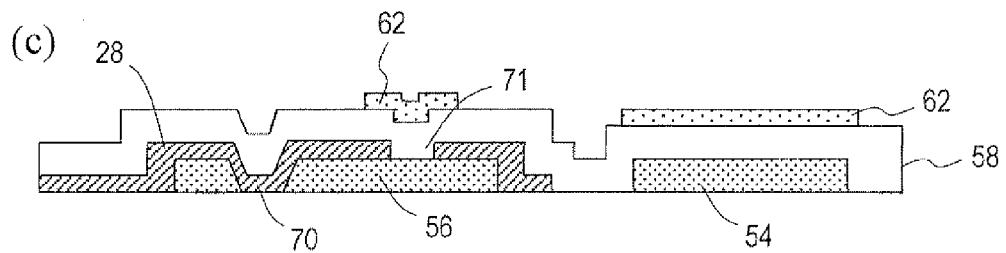
Figure 10:
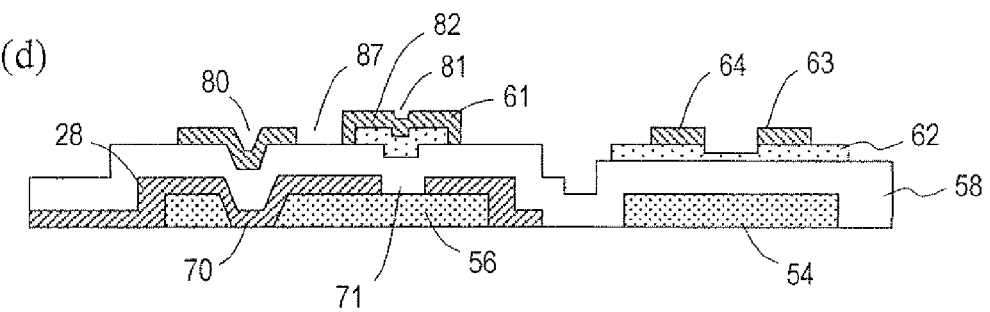
Figure 10:
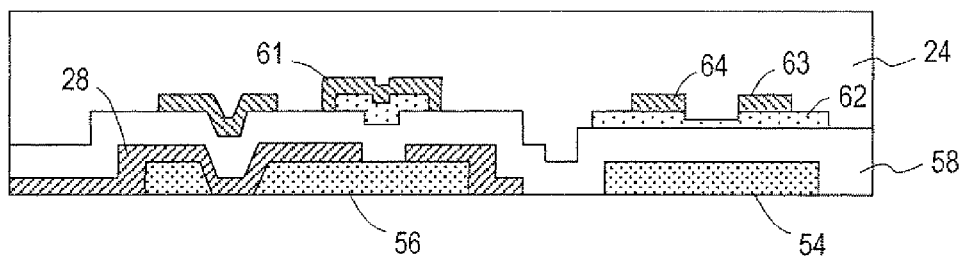

FIG. 9 is plan views for describing a production method for the TFT substrate 12, schematically showing production steps for the portion shown in FIG. 7. FIG. 10 is cross-sectional views for describing a production method for the TFT substrate 12, schematically showing production steps for the portion shown in FIG. 8.

As shown in FIG. 9(a) and FIG. 10(a), first, by a method such as sputtering, a thin metal film of Ta (tantalum) or the like is formed on a transparent substrate having been cleaned. Thereafter, the Cs metal layer 56 having the gate electrode 54 and the apertures 70 is formed by photolithography technique. In this step, the gate line 54 and the Cs line 56 shown in FIG. 7 are also formed concurrently from the same metal.

Next, as shown in FIG. 9(b) and FIG. 10(b), a transparent electrode film of ITO, IZO, or the like is formed on the substrate including the gate electrode 54 and the Cs metal layer 56 by sputtering technique or the like, and the transparent electrode film having been stacked is pattern-shaped by photolithography technique, whereby the counter electrode 28 is formed. At this time, a plurality of apertures 71 are formed in the counter electrode 28.

Next, as shown in FIG. 9(c) and FIG. 10(c), after the insulating layer 58 is stacked on the entire substrate surface, a semiconductor film is stacked on the insulating layer 58, and the stacked semiconductor film is shaped by photolithography technique, thereby forming the semiconductor layer 62.

Next, as shown in FIG. 9(d) and FIG. 10(d), a thin metal film of Al or the like is formed on the entire substrate surface by sputtering technique or the like, and a photolithography technique is employed to form the source electrode 63, the source line 52, the drain electrode 64, and the reflective layer 61. At this time, in the reflective layer 61, the recess 80, the recess 81, and the protrusion 82 are formed so as to conform to the shapes of the apertures 70 in the Cs metal layer 56, the apertures 71 in the counter electrode 28, and the semiconductor layer 62. The aperture 87 is formed also in the reflective layer 61 itself.

Next, as shown in FIG. 9(e) and FIG. 10(e), a photosensitive acrylic resin is applied onto the substrate by spin-coating, whereby the interlayer insulating layer 24 is formed. The contact hole 65 is formed in the interlayer insulating layer 24 over the drain electrode 64.

Finally, the pixel electrode 26 is formed on the interlayer insulating layer 24, whereby the TFT substrate 12 shown in FIG. 7 and FIG. 8 is completed.

Embodiment 3

Next, with reference to FIGS. 11 to 14, a third embodiment of the liquid crystal display device according to the present invention will be described. The liquid crystal display device of the present embodiment differs from the Embodiment 1 only with respect to a portion of the construction of the TFT substrate 12, and is identical to Embodiment 1 including the production method, effects, and the like, except for what is described below. Constituent elements which are identical to those of Embodiment 1 will be denoted by like reference numerals, and detailed descriptions thereof will be omitted.

Figure 11:
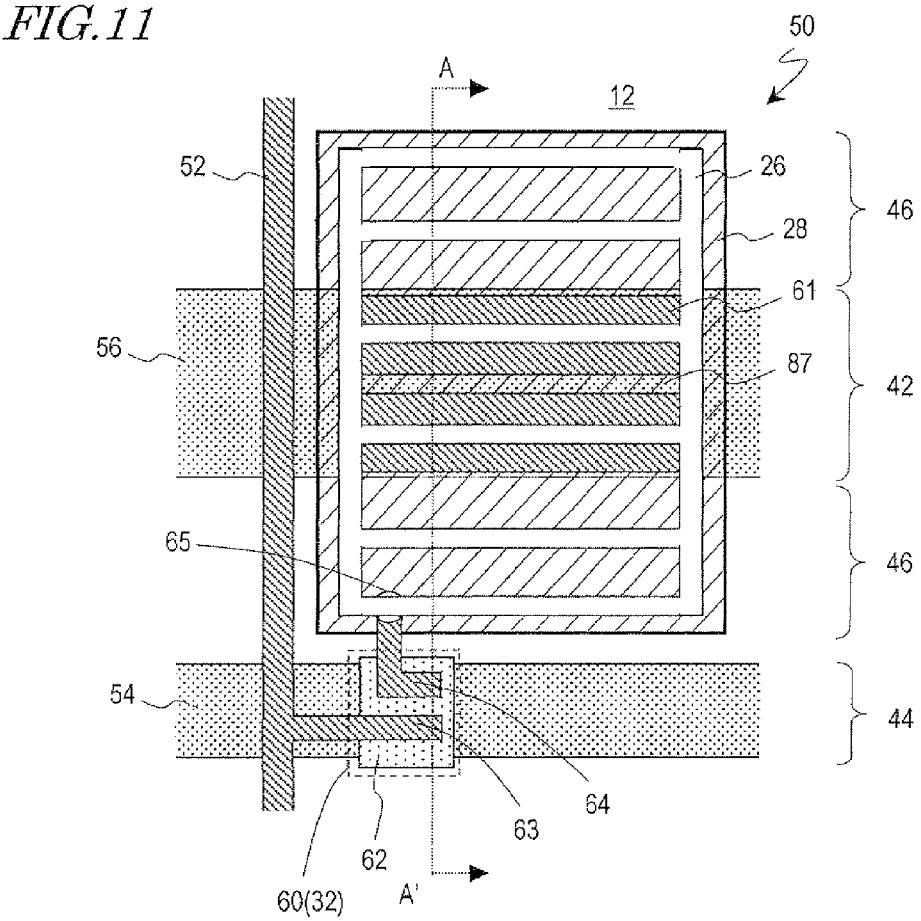
FIG. 11 A plan view schematically showing the construction of a TFT substrate of a liquid crystal display device of Embodiment 3.
Figure 12:
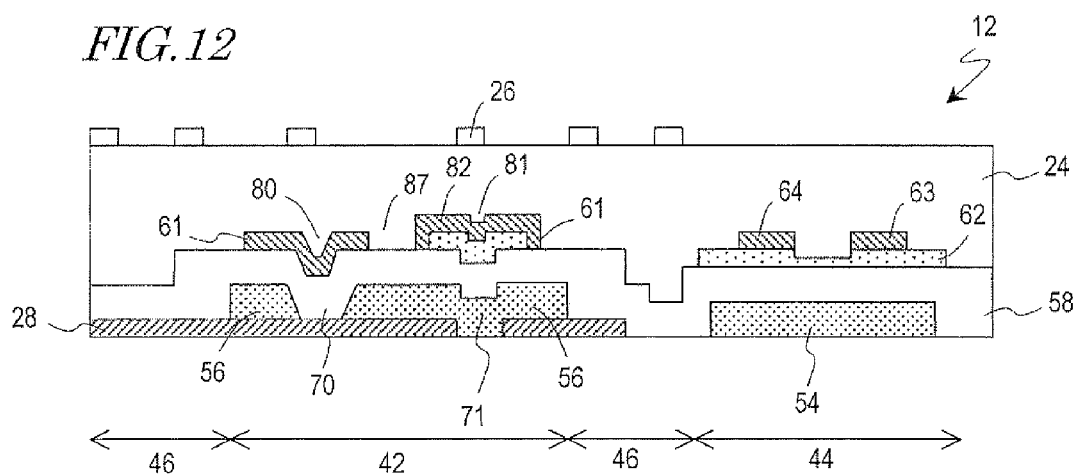
FIG. 12 A diagram schematically showing a cross-sectional structure of the TFT substrate of the liquid crystal display device of Embodiment 3.

FIG. 11 is a plan view schematically showing the construction of the TFT substrate 12 corresponding to one pixel 50 of the liquid crystal display device 10 shown in FIG. 1. FIG. 12 is a cross-sectional view schematically showing an A-A' cross section of the TFT substrate 12 shown in FIG. 11.

As shown in FIG. 11 and FIG. 12, in the reflection region 42 of the TFT substrate 12 of Embodiment 3, the Cs metal layer 56 is stacked on the counter electrode 28 so as to be in contact with the counter electrode 28, the insulating layer 58 is stacked on the Cs metal layer 56, and the semiconductor layer 62 and the reflective layer 61 are stacked on the insulating layer 58. An aperture (gap or slit) 87 is formed in the reflective layer 61, such that the reflective layer 61 is divided into two portions because of the aperture 87.

As shown in FIG. 12, recesses 80 conforming to the apertures 70 in the Cs metal layer 56, recess 81 conforming to the apertures 71 in the counter electrode 28, and protrusions 82 conforming to the island shapes of semiconductor layer 62 are formed in the reflective layer 61. The aperture 87 is formed also in the reflective layer 61 itself. This makes it possible to form a multitude of corner portions on the surface of the reflective layer 61. Note that a recess or protrusion may be formed instead of the aperture 87 in the reflective layer 61.

Next, with reference to FIG. 13 and FIG. 14, a production method for the TFT substrate 12 of Embodiment 3 will be described.

Figure 13:
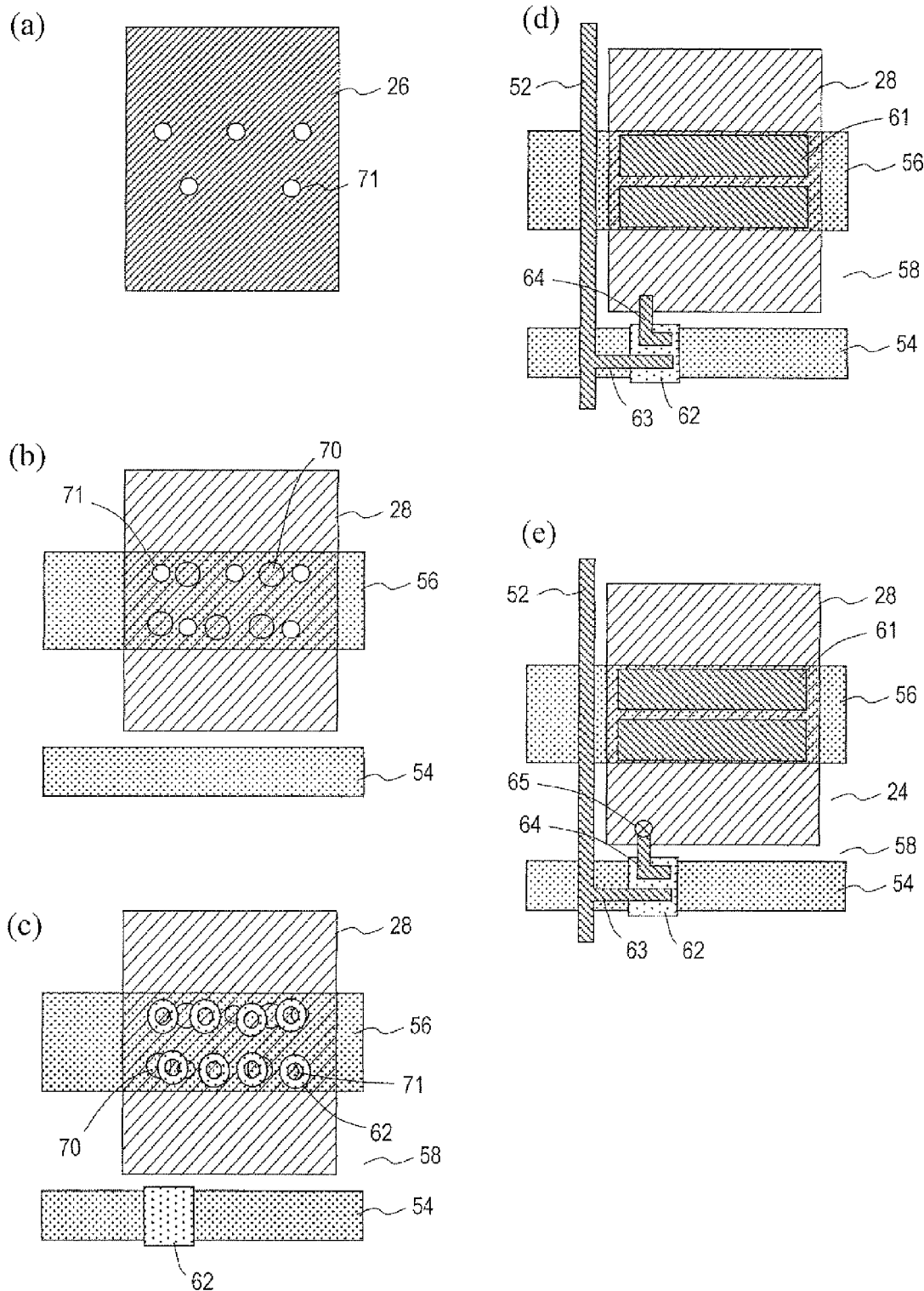
FIG. 13 Plan views showing a production method for the TFT substrate of Embodiment 3.
Figure 14:
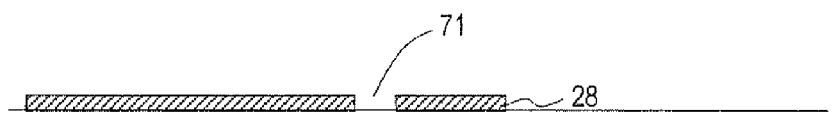
FIG. 14 Cross-sectional views showing the production method for the TFT substrate of Embodiment 3.
Figure 14:
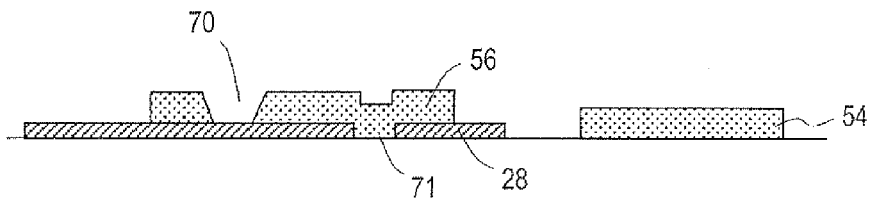
Figure 14:
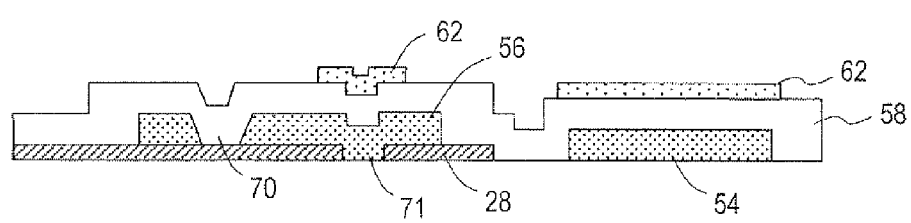
Figure 14:
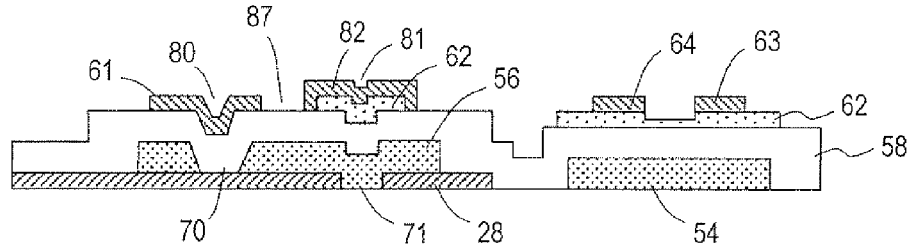
Figure 14:
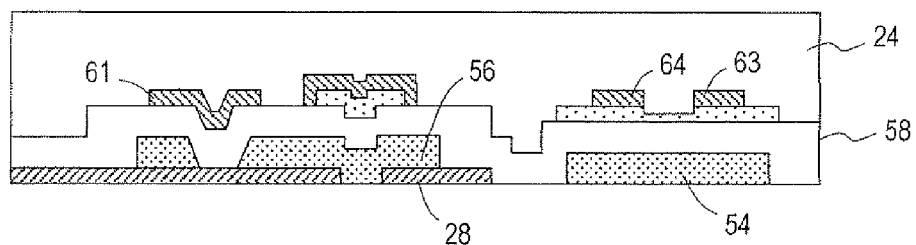

FIG. 13 is plan views for describing a production method for the TFT substrate 12, schematically showing production steps for the portion shown in FIG. 11. FIG. 14 is cross-sectional views for describing a production method for the TFT substrate 12, schematically showing production steps for the portion shown in FIG. 12.

As shown in FIG. 13(a) and FIG. 14(a), first, a transparent electrode film of ITO, IZO, or the like is stacked on a transparent substrate by sputtering technique or the like, and the transparent electrode film having been stacked is pattern-shaped by photolithography technique, whereby the counter electrode 28 is formed. At this time, a plurality of apertures 71 are formed in the counter electrode 28.

Next, as shown in FIG. 13(b) and FIG. 14(b), a thin metal film of Ta (tantalum) or the like is formed by a method such as sputtering, and the Cs metal layer 56 having the gate electrode 54 and the apertures 70 is formed by photolithography technique. At this time, recesses conforming to the apertures 71 in the counter electrode 28 are formed in the Cs metal layer 56. Note that, In this step, the gate line 54 and the Cs line 56 shown in FIG. 11 are also formed concurrently from the same metal.

Next, as shown in FIG. 13(c) and FIG. 14(c), the insulating layer 58 is stacked on the entire substrate surface, and after a semiconductor film is stacked thereupon, the stacked semiconductor film is shaped by photolithography technique, thereby forming the semiconductor layer 62.

Next, as shown in FIG. 13(d) and FIG. 14(d), a thin metal film of Al or the like is formed on the entire substrate surface by sputtering technique or the like, and a photolithography technique is employed to form the source electrode 63, the source line 52, the drain electrode 64, and the reflective layer 61. At this time, in the reflective layer 61, the recesses 80, the recesses 81, and the protrusions 82 are formed so as to conform to the shapes of the apertures 70 in the Cs metal layer 56, the apertures 71 in the counter electrode 28, and the semiconductor layer 62. Moreover, the aperture 87 is formed also in the reflective layer 61 itself.

Next, as shown in FIG. 13(e) and FIG. 14(e), a photosensitive acrylic resin is applied onto the substrate by spin-coating, whereby the interlayer insulating layer 24 is formed. The contact hole 65 is formed in the interlayer insulating layer 24 over the drain electrode 64.

Finally, the pixel electrode 26 is formed on the interlayer insulating layer 24, whereby the TFT substrate 12 shown in FIG. 11 and FIG. 12 is completed.

Embodiment 4

Next, with reference to FIGS. 15 to 18, a fourth embodiment of the liquid crystal display device according to the present invention will be described. The liquid crystal display device of the present embodiment differs from the Embodiment 1 only with respect to a portion of the construction of the TFT substrate 12, and is identical to Embodiment 1 including the production method, effects, and the like, except for what is described below. Constituent elements which are identical to those of Embodiment 1 will be denoted by like reference numerals, and detailed descriptions thereof will be omitted.

Figure 15:
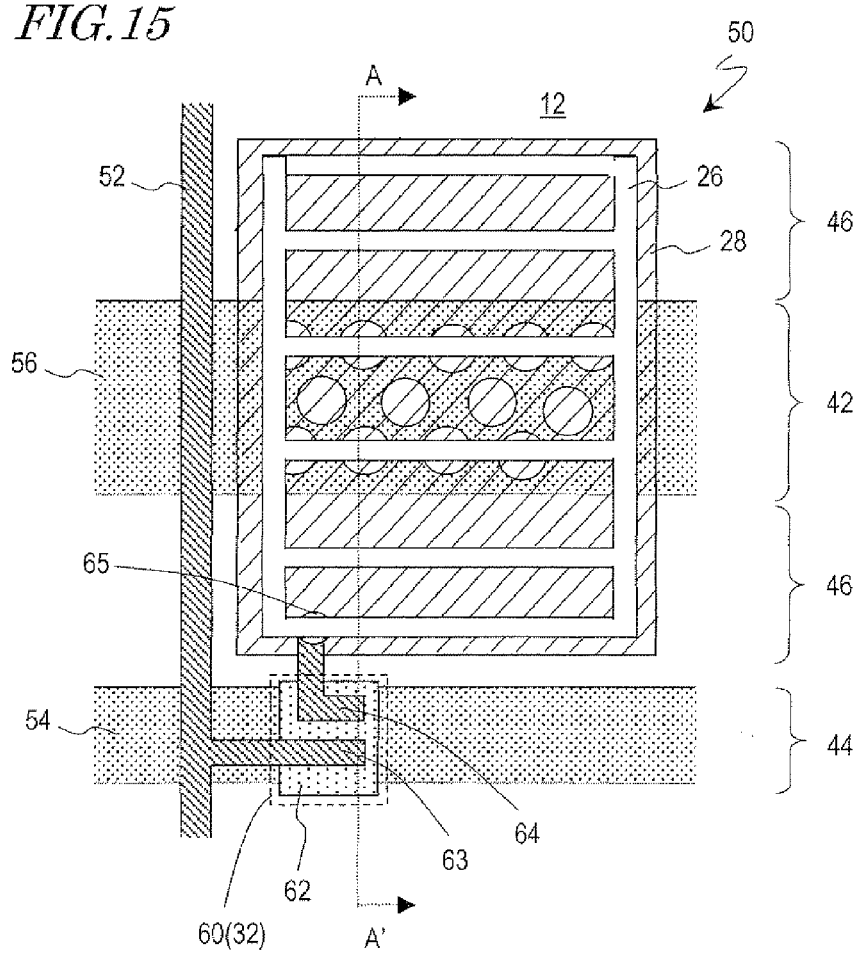
FIG. 15 A plan view schematically showing the construction of a TFT substrate of a liquid crystal display device of Embodiment 4.
Figure 16:
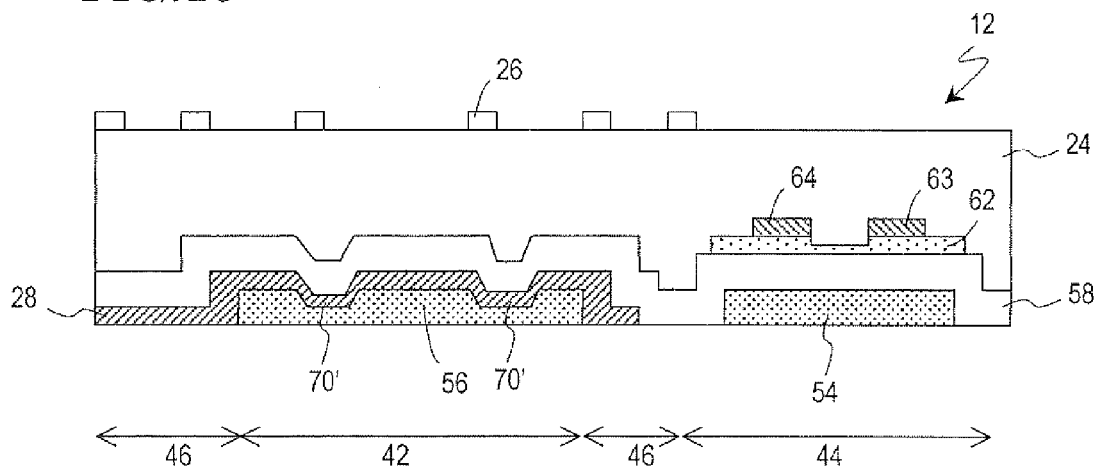
FIG. 16 A diagram schematically showing a cross-sectional structure of the TFT substrate of the liquid crystal display device of Embodiment 4.

FIG. 15 is a plan view schematically showing the construction of the TFT substrate 12 corresponding to one pixel 50 of the liquid crystal display device 10 shown in FIG. 1. FIG. 16 is a cross-sectional view schematically showing an A-A' cross section of the TFT substrate 12 shown in FIG. 15.

As shown in FIG. 15 and FIG. 16, in the reflection region 42 of the TFT substrate 12 of Embodiment 4, the counter electrode 28 is stacked on the Cs metal layer 56 so as to be in contact with the Cs metal layer 56, and the insulating layer 58 is stacked on the counter electrode 28, but the semiconductor layer 62 and the reflective layer 61 are not stacked here (in the TFT region 44, similarly to Embodiment 1, the semiconductor layer 62, the source electrode 63 and the drain electrode 64 are formed).

In the reflection region 42 of Embodiment 4, the Cs metal layer 56 functions as a reflective layer. Therefore, rather than apertures 70, recesses 701 are formed in the Cs metal layer 56, whereby a plurality of corner portions and slopes are formed in the surface of the Cs metal layer 56, thus improving the efficiency of utility of reflected light.

Next, with reference to FIG. 17 and FIG. 18, a production method for the TFT substrate 12 of the Embodiment 4 will be described.

Figure 17:
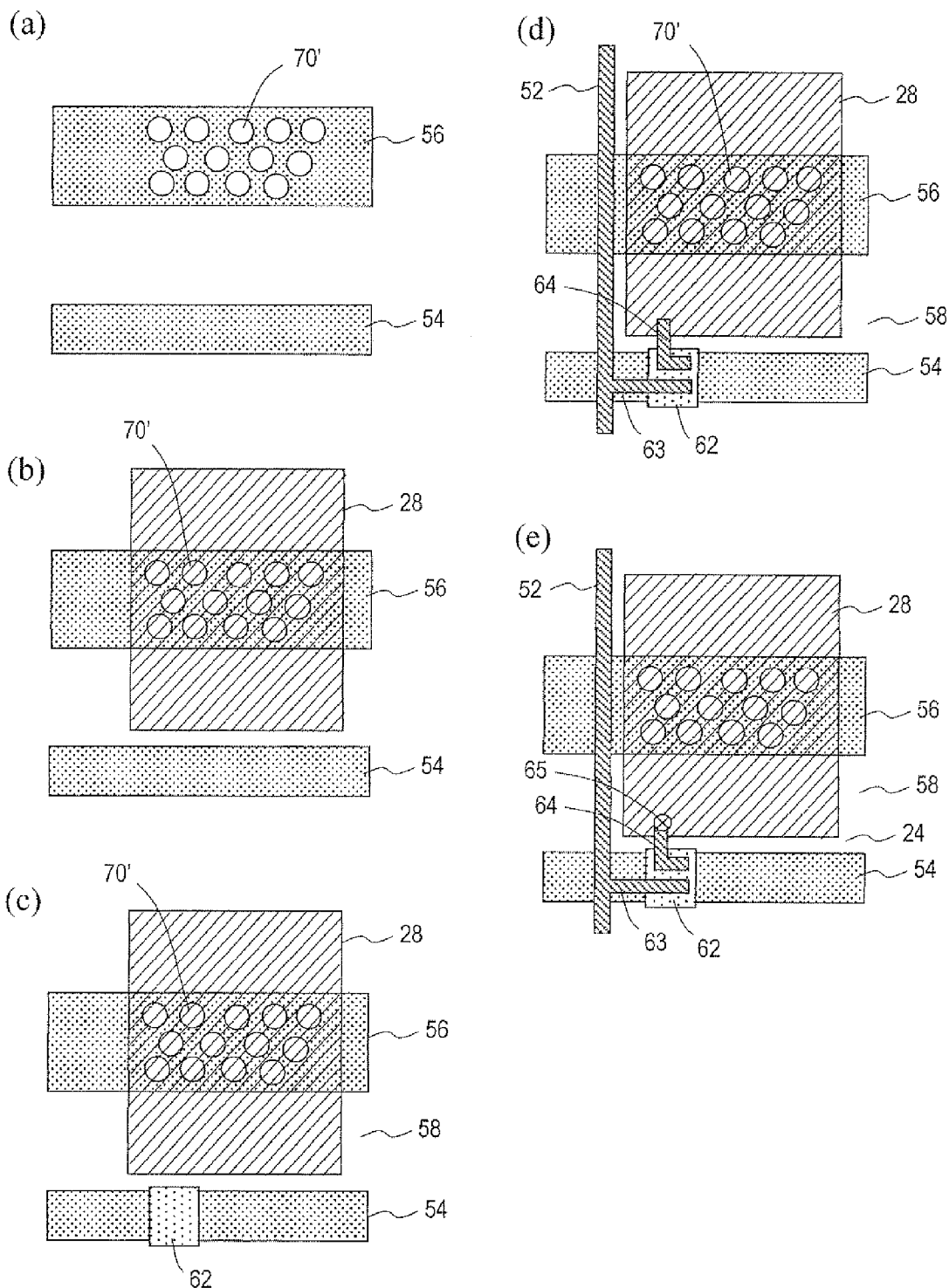
FIG. 17 Plan views showing a production method for the TFT substrate of Embodiment 4.
Figure 18:
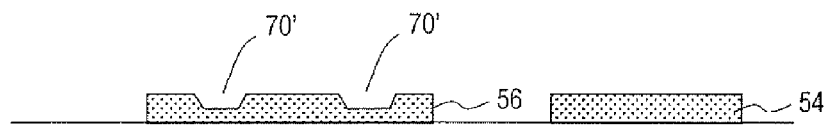
FIG. 18 Cross-sectional views showing the production method for the TFT substrate of Embodiment 4.
Figure 18:
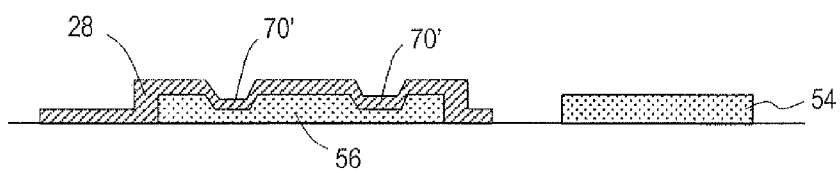
Figure 18:
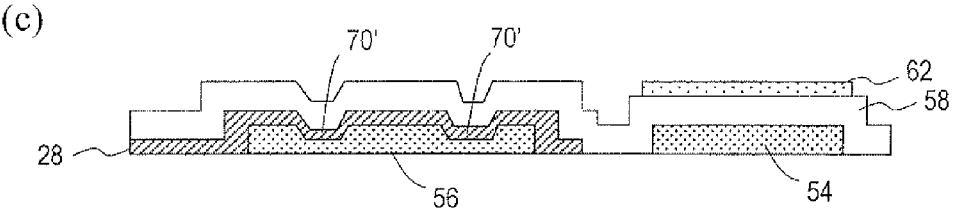
Figure 18:
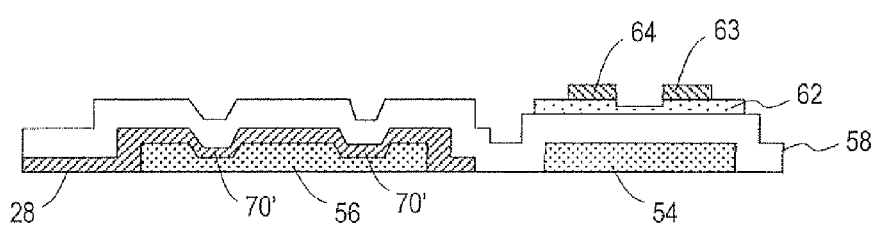
Figure 18:
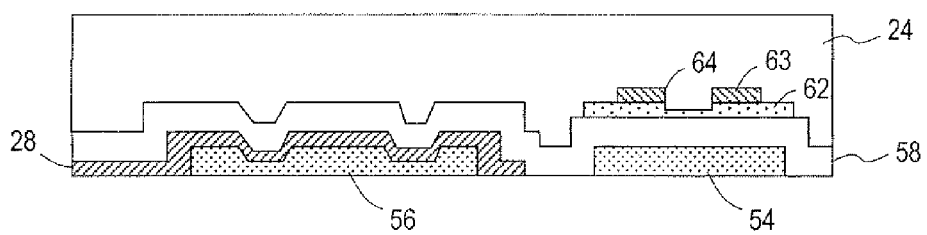

FIG. 17 is plan views for describing a production method for the TFT substrate 12, schematically showing production steps for the portion shown in FIG. 15. FIG. 18 is cross-sectional views for describing a production method for the TFT substrate 12, schematically showing production steps for the portion shown in FIG. 16.

As shown in FIG. 17(a) and FIG. 18(a), first, by a method such as sputtering, a thin metal film of Ta (tantalum) or the like is formed, and the Cs metal layer 56 having the gate electrode 54 and the recesses 701 is formed by photolithography technique. In this step, the gate line 54 and the Cs line 56 shown in FIG. 15 are also formed concurrently from the same metal.

Next, as shown in FIG. 17(b) and FIG. 18(b), a transparent electrode film of ITO, IZO, or the like is stacked by sputtering technique or the like, and the transparent electrode film having been stacked is pattern-shaped by photolithography technique, whereby the counter electrode 28 is formed. At this time, recesses conforming to the recesses 70' are formed in the counter electrode 28.

Next, as shown in FIG. 17(c) and FIG. 18(c), the insulating layer 58 is stacked on the entire substrate surface, and a semiconductor film is stacked thereupon. Thereafter, the stacked semiconductor film is shaped by photolithography technique to form the semiconductor layer 62. However, herein, the semiconductor layer 62 is only formed in the TFT region 44.

Next, with reference to FIG. 17(d) and FIG. 18(d), a thin metal film of Al or the like is stacked on the entire substrate surface by sputtering technique or the like, and a photolithography technique is employed to form the source electrode 63, the drain electrode 64, and the source line 52. At this time, any thin metal film that has been stacked on the reflection region 42 and the transmission region 46 is removed.

Next, as shown in FIG. 17(e) and FIG. 18(e), a photosensitive acrylic resin is applied onto the substrate by spin-coating, whereby the interlayer insulating layer 24 is formed. The contact hole 65 is formed in the interlayer insulating layer 24 over the drain electrode 64.

Finally, the pixel electrode 26 is formed on the interlayer insulating layer 24, whereby the TFT substrate 12 shown in FIG. 15 and FIG. 16 is completed.

Embodiment 5

Next, with reference to FIGS. 19 to 22, a fifth embodiment of the liquid crystal display device according to the present invention will be described. The liquid crystal display device of the present embodiment differs from the Embodiment 1 only with respect to a portion of the construction of the TFT substrate 12, and is identical to Embodiment 1 including the production method, effects, and the like, except for what is described below. Constituent elements which are identical to those of Embodiment 1 will be denoted by like reference numerals, and detailed descriptions thereof will be omitted.

Figure 19:
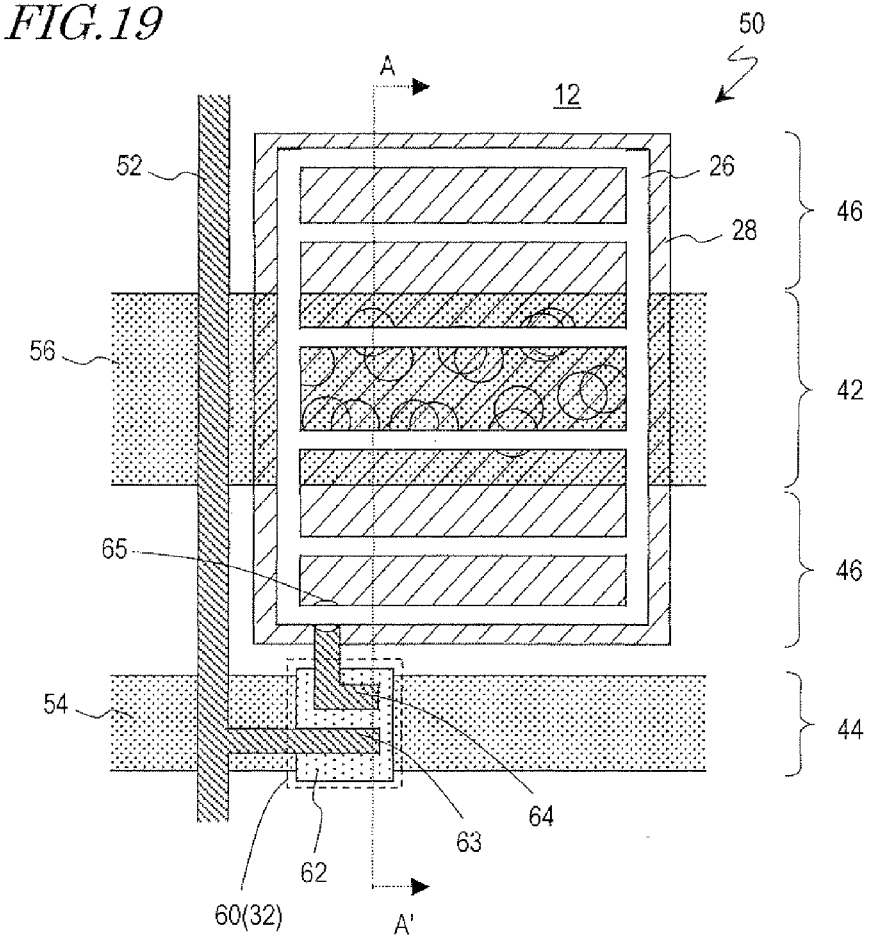
FIG. 19 A plan view schematically showing the construction of a TFT substrate of a liquid crystal display device of Embodiment 5.
Figure 20:
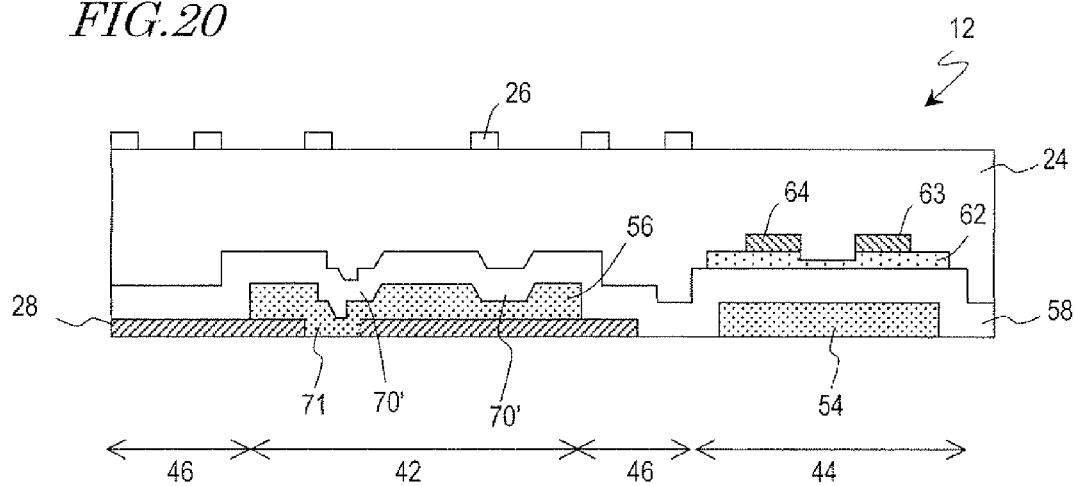
FIG. 20 A diagram schematically showing a cross-sectional structure of the TFT substrate of the liquid crystal display device of Embodiment 5.

FIG. 19 is a plan view schematically showing the construction of the TFT substrate 12 corresponding to one pixel 50 of the liquid crystal display device 10 shown in FIG. 1. FIG. 20 is a cross-sectional view schematically showing an A-A' cross section of the TFT substrate 12 shown in FIG. 19.

As shown in FIG. 19 and FIG. 20, in the reflection region 42 of the TFT substrate 12 of Embodiment 5, the Cs metal layer 56 is stacked on the counter electrode 28 so as to in contact with the counter electrode 28, and the insulating layer 58 is stacked on the Cs metal layer 56, but the semiconductor layer 62 and the reflective layer 61 are not stacked here (in the TFT region 44, similarly to Embodiment 1, the semiconductor layer 62, the source electrode 63, and the drain electrode 64 are formed).

In the reflection region 42 of Embodiment 5, the Cs metal layer 56 functions as a reflective layer. Therefore, rather than apertures 70, recesses 70' are formed in the Cs metal layer 56. Moreover, apertures 71 are formed in the counter electrode 28. Therefore, recesses conforming to the apertures 71 are formed in addition to the recesses 701, so that a plurality of corner portions and slopes are formed on the surface of the Cs metal layer 56, thus improving the efficiency of utility of reflected light. Note that, herein, the Cs metal layer 56 also has the function of a counter electrode because the Cs metal layer 56 is in electrical contact with the counter electrode 28.

Next, with reference to FIG. 21 and FIG. 22, a production method for the TFT substrate 12 of Embodiment 5 will be described.

Figure 21:
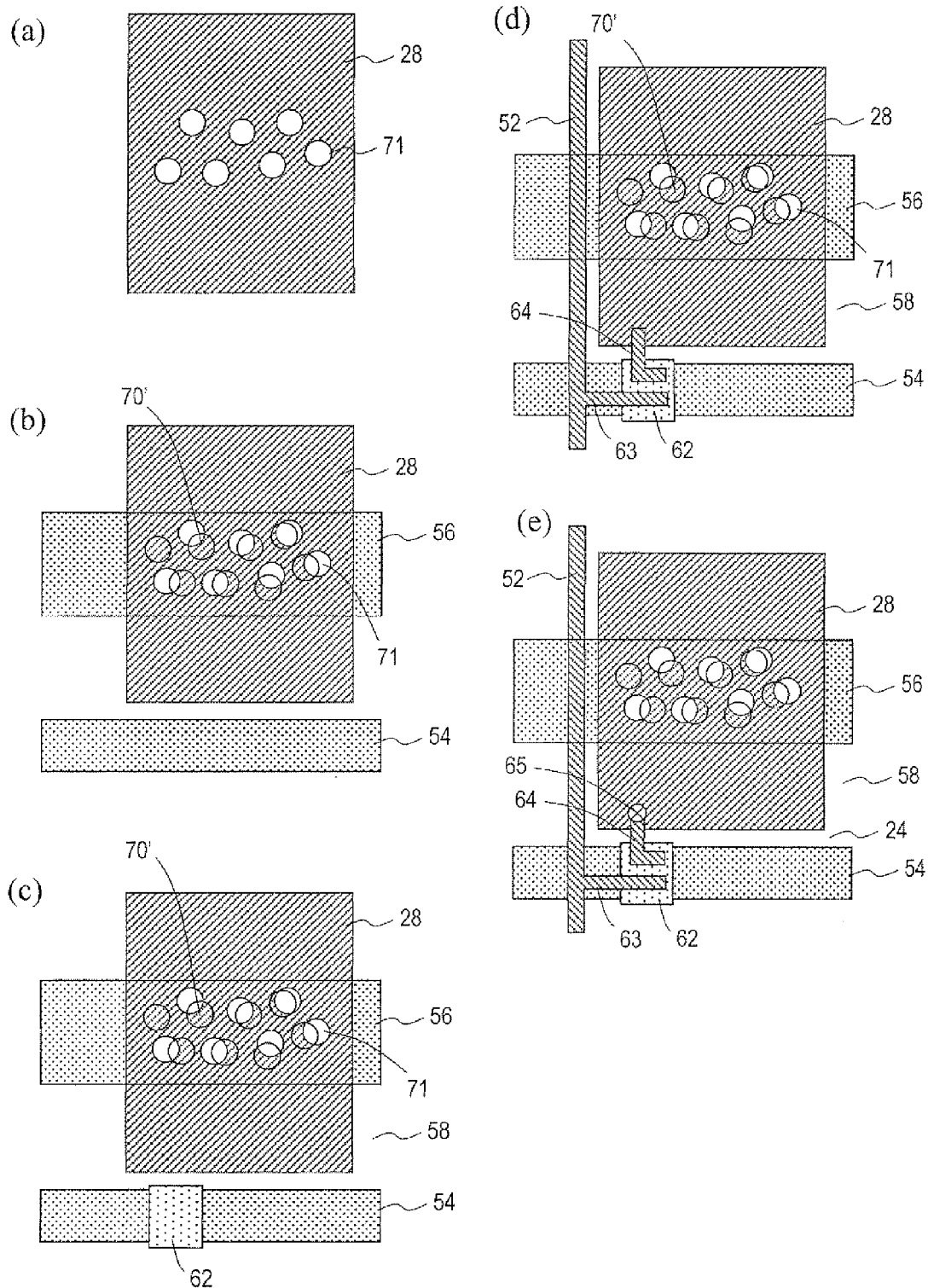
FIG. 21 Plan views showing a production method for the TFT substrate of Embodiment 5.

FIG. 21 is plan views for describing a production method for the TFT substrate 12, schematically showing production steps for the portion shown in FIG. 19. FIG. 22 is cross-sectional views for describing a production method for the TFT substrate 12, schematically showing production steps for the portion shown in FIG. 20.

As shown in FIG. 21(a) and FIG. 22(a), first, a transparent electrode film of ITO, IZO, or the like is stacked by sputtering technique or the like, and the transparent electrode film having been stacked is pattern-shaped by photolithography technique, whereby the counter electrode 28 is formed. At this time, the apertures 71 are formed in the counter electrode 28.

Next, as shown in FIG. 21(b) and FIG. 22(b), a thin metal film of Ta (tantalum) or the like is formed by a method such as sputtering, and the gate electrode 54 and the Cs metal layer 56 are formed by photolithography technique. At this time, the recesses 70' are formed in the Cs metal layer 56. Moreover, recesses conforming to the apertures 71 in the counter electrode 28 are also formed in the Cs metal layer 56. Note that, in this step, the gate line 54 and the Cs line 56 shown in FIG. 19 are also formed concurrently from the same metal.

Next, as shown in FIG. 21(c) and FIG. 22(c), the insulating layer 58 is stacked on the entire substrate surface, and a semiconductor film is stacked thereupon. Thereafter, the stacked semiconductor film is shaped by photolithography technique to form the semiconductor layer 62. However, herein, the semiconductor layer 62 is only formed in the TFT region 44.

Figure 22:
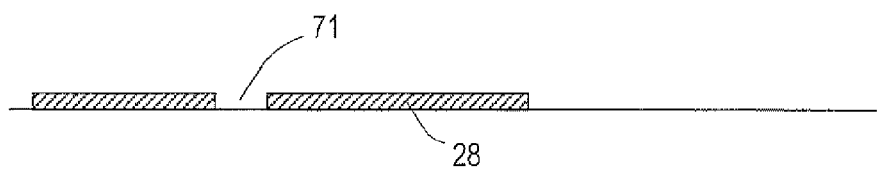
FIG. 22 Cross-sectional views showing the production method for the TFT substrate of Embodiment 5.
Figure 22:
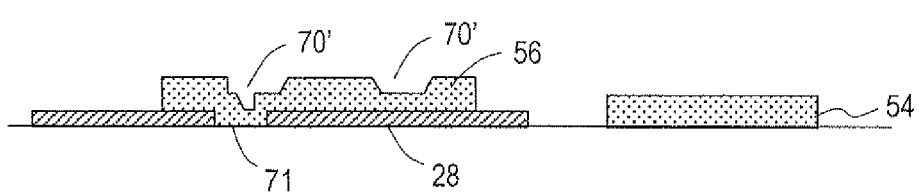
Figure 22:
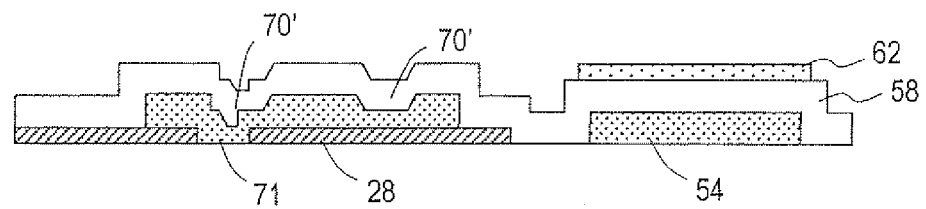
Figure 22:
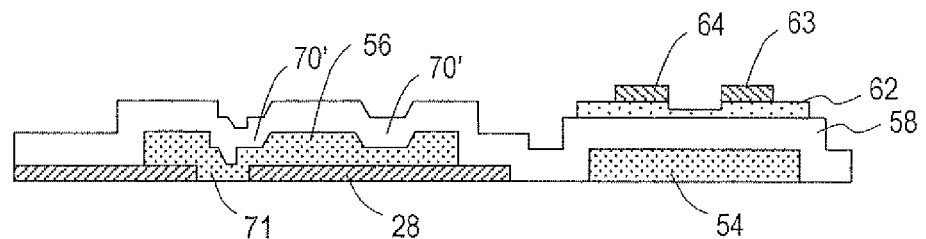
Figure 22:
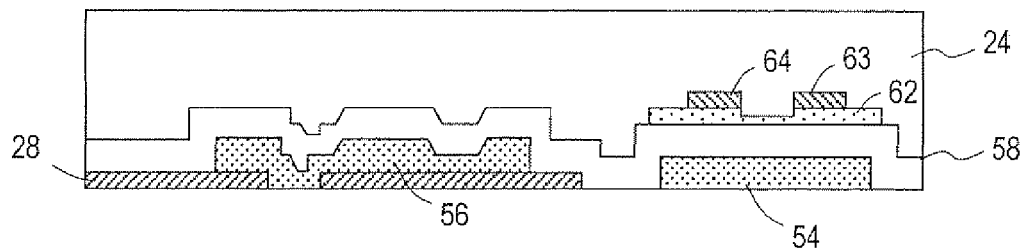

Next, as shown in FIG. 21(*d*) and FIG. 22(*d*), a thin metal film of Al or the like is stacked on the entire substrate surface by sputtering technique or the like, and a photolithography technique is employed to form the source electrode 63, the drain electrode 64, and the source line 52. At this time, any thin metal film that has been stacked on the reflection region 42 and the transmission region 46 is removed.

Next, as shown in FIG. 21(*e*) and FIG. 22(*e*), a photosensitive acrylic resin is applied onto the substrate by spin-coating, whereby the interlayer insulating layer 24 is formed. The contact hole 65 is formed in the interlayer insulating layer 24 over the drain electrode 64.

Finally, the pixel electrode 26 is formed on the interlayer insulating layer 24, whereby the TFT substrate 12 shown in FIG. 19 and FIG. 20 is completed.

Embodiment 6

Next, with reference to FIGS. 23 to 26, a sixth embodiment of the liquid crystal display device according to the present invention will be described.

The liquid crystal display device of the present embodiment is an IPS mode transflective-type liquid crystal display device, whose overall construction is basically the same as that shown in FIG. 1. However, it is different from the liquid crystal display device of Embodiment 1 in terms of the construction of the TFT substrate 12. Therefore, those constituents of the TFT substrate 12 which are different from of Embodiment 1 will be mainly described below, and the descriptions of any portion that is identical to Embodiment 1 will be omitted, including the production method, effects, and the like. Moreover, constituent elements which are identical to those of Embodiment 1 will be denoted by like reference numerals, and descriptions thereof will be omitted.

Figure 23:
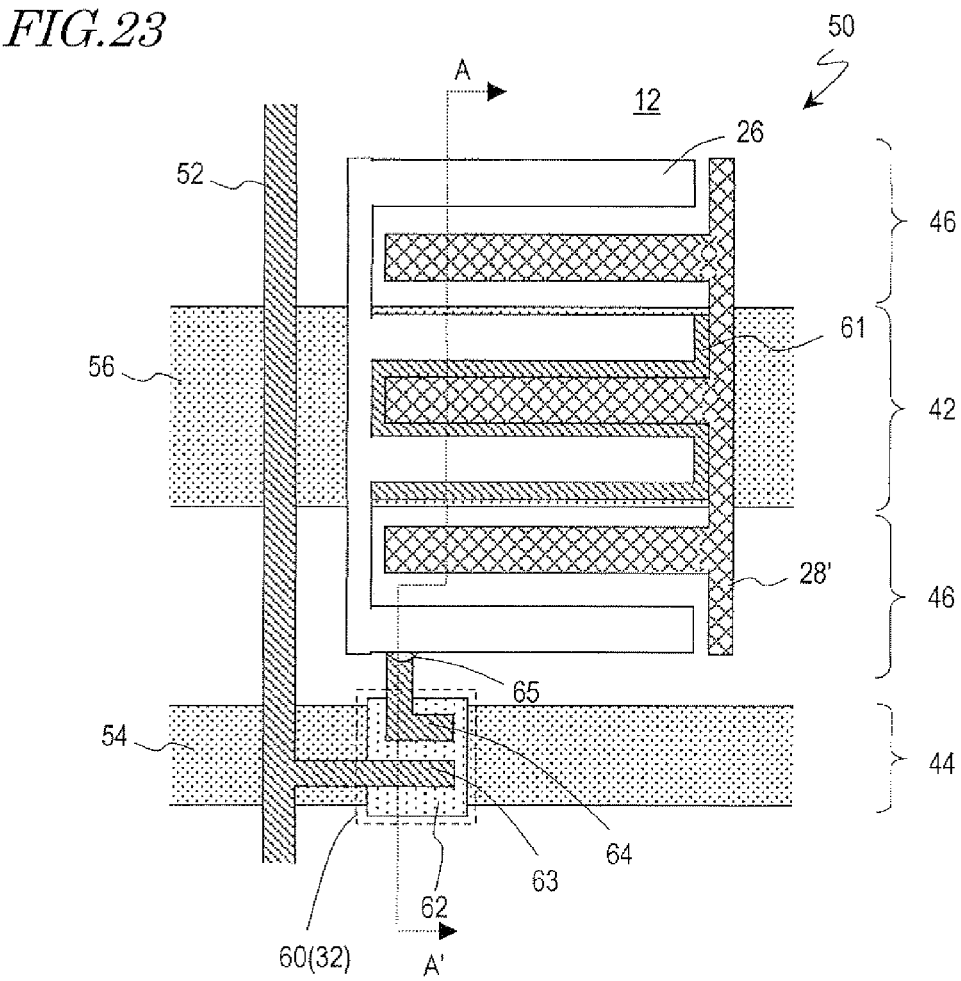
FIG. 23 A plan view schematically showing the construction of a TFT substrate of a liquid crystal display device of Embodiment 6.
Figure 24:
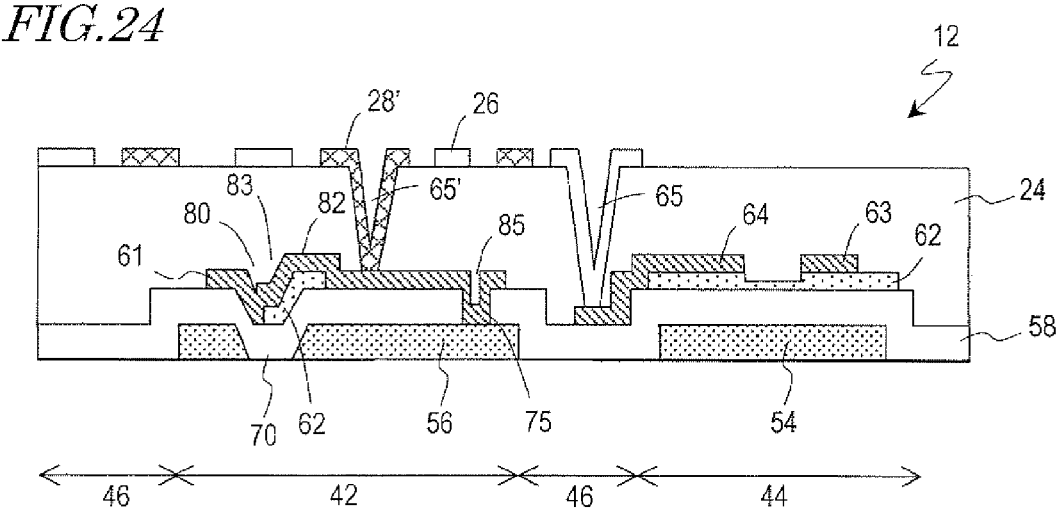
FIG. 24 A diagram schematically showing a cross sectional structure of the TFT substrate of the liquid crystal display device of Embodiment 6.

FIG. 23 is a plan view schematically showing the construction of the TFT substrate 12 corresponding to one pixel 50 of the liquid crystal display device of the present embodiment. FIG. 24 is a cross-sectional view schematically showing an A-A' cross section of the TFT substrate 12 shown in FIG. 23.

As shown in FIG. 23 and FIG. 24, on the upper face of the TFT substrate 12 in Embodiment 6 (the upper face of the interlayer insulating layer 24), a pixel electrode 26 and a counter electrode 28' in interdigitated shapes each having a plurality of projections are formed, and orientation control of the liquid crystal is performed in accordance with a voltage which is applied between the projections of the pixel electrode 26 and the projections of the counter electrode 28'.

The pixel electrode 26 is electrically connected to the drain electrode 64 of the TFT 60 via the contact hole 65 formed in the interlayer insulating layer 24, whereas the counter electrode 28' is electrically connected to the reflective layer 61 formed in the reflection region 42 via a contact hole 651 which is formed in the interlayer insulating layer 24. Under the reflective layer 61, the Cs metal layer 56 having the apertures 70, the insulating layer 58, and the island shapes of semiconductor layer 62 are formed in this order from the bottom. The reflective layer 61 is electrically connected to the Cs metal layer 56 via the contact hole 75 which is formed in the insulating layer 58.

The reflective layer 61 has recesses 80 which are formed in accordance with the apertures 70 in the Cs metal layer 56, protrusions 82 which are formed in accordance with the island shapes of semiconductor layer 62, level differences 83 which are formed in accordance with the apertures 70 and the semiconductor layer 62, and a recess 85 which is formed in accordance with the contact hole 75 in the interlayer insulating layer 24. Thus, a plurality of corner portions and slopes are formed on the surface of the reflective layer 61, thus improving the efficiency of utility of reflected light.

Next, with reference to FIG. 25 and FIG. 26, a production method for the TFT substrate 12 of Embodiment 6 will be described.

Figure 25:
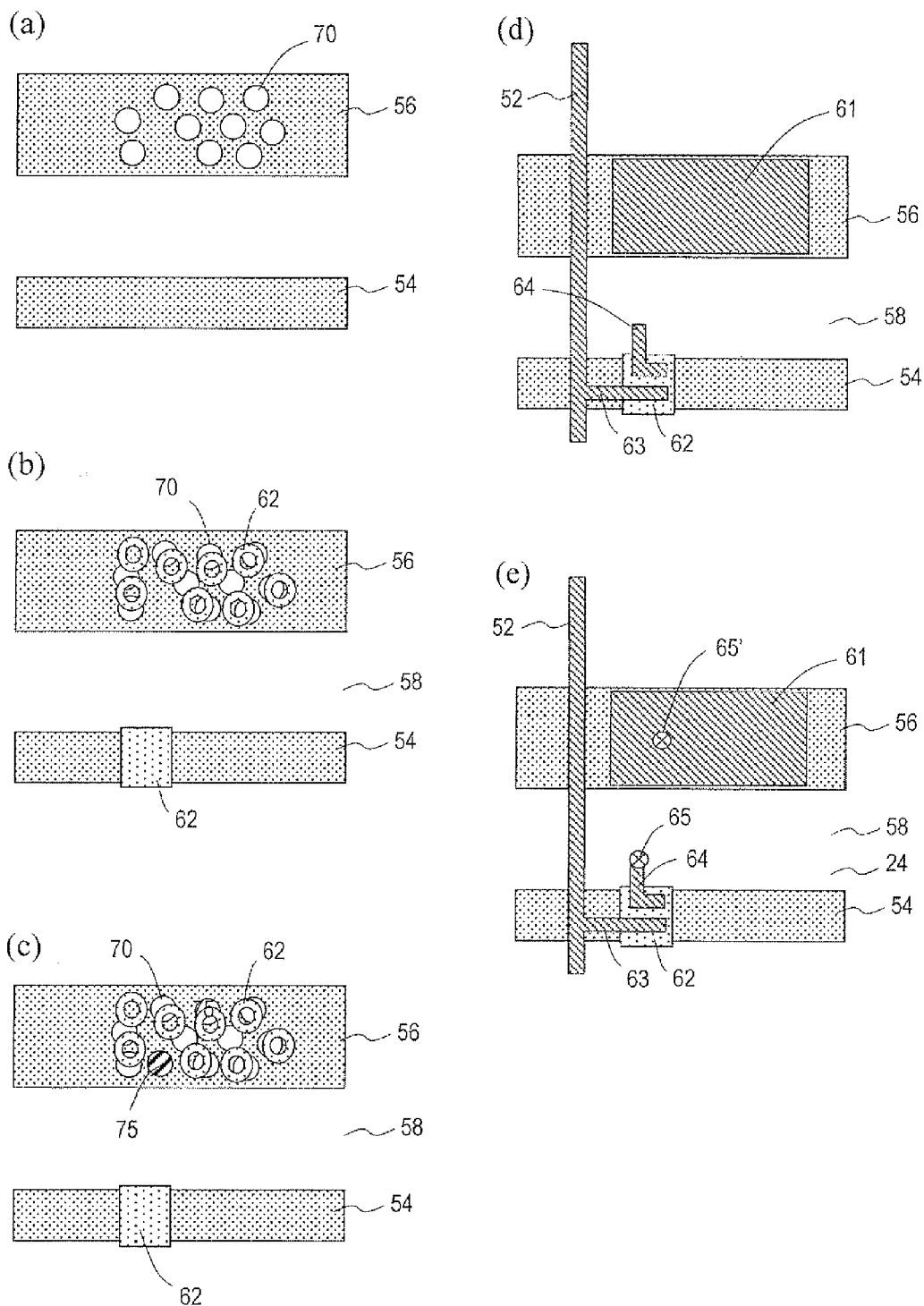
FIG. 25 Plan views showing a production method for the TFT substrate of Embodiment 6.

FIG. 25 is plan views for describing a production method for the TFT substrate 12, schematically showing production steps for the portion shown in FIG. 23. FIG. 26 is cross-sectional views for describing a production method for the TFT substrate 12, schematically showing production steps for the portion shown in FIG. 24.

Figure 26:
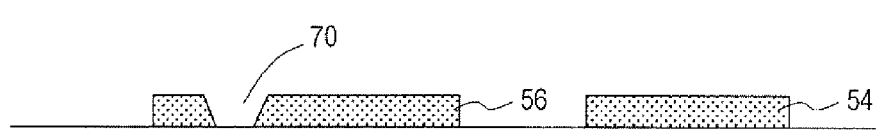
FIG. 26 Cross-sectional views showing the production method for the TFT substrate of Embodiment 6.
Figure 26:
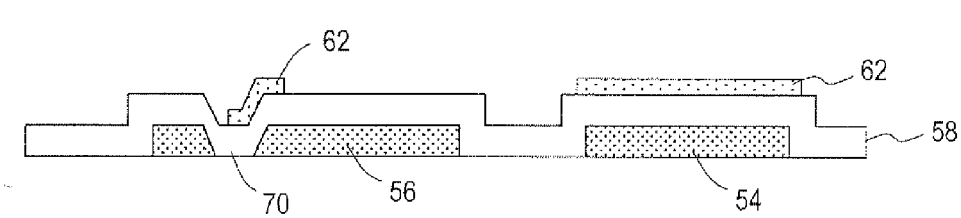
Figure 26:
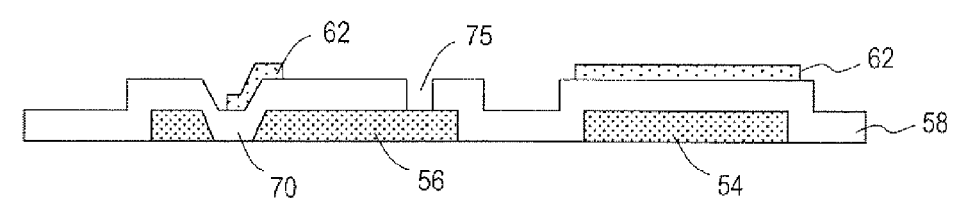
Figure 26:
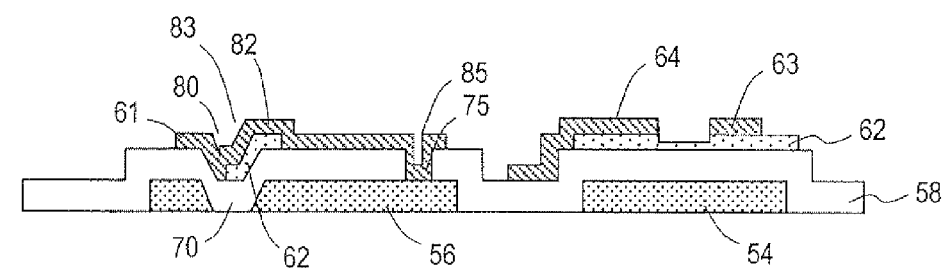
Figure 26:
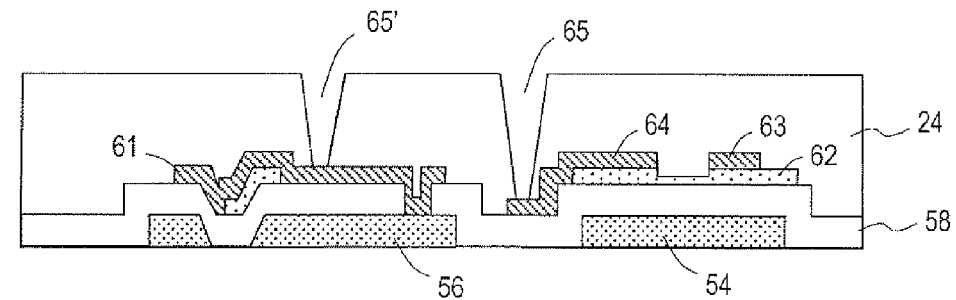

As shown in FIG. 25(*a*) and FIG. 26(*a*), first, by a method such as sputtering, a thin metal film of Ta (tantalum) or the like is formed, and the gate electrode 54 and the Cs metal layer 56 are formed by photolithography technique. At this time, the apertures 70 are formed in the Cs metal layer 56. Note that, in this step, the gate line 54 and the Cs line 56 shown in FIG. 23 are also formed concurrently from the same metal.

Next, as shown in FIG. 25(*b*) and FIG. 26(*b*), the insulating layer 58 is stacked on the entire substrate surface, and a semiconductor film is stacked thereupon. Thereafter, the stacked semiconductor film is shaped by photolithography technique to form the semiconductor layer 62. Herein, a plurality of island shapes of semiconductor layer 62 are formed in the reflection region 42, at least some of which overlap the apertures 70.

Next, as shown in FIG. 25(*c*) and FIG. 26(*c*), the contact hole 75 is formed in the insulating layer 58 by photolithography technique or the like.

Next, as shown in FIG. 25(*d*) and FIG. 26(*d*), a thin metal film of Al or the like is stacked on the entire substrate surface by sputtering technique or the like, and a photolithography technique is employed to form the source electrode 63, the drain electrode 64, the reflective layer 61, and the source line 52. At this time, in the reflective layer 61, the recesses 80 conforming to the shapes of the apertures 70 in the Cs metal layer 56, the protrusions 82 conforming to the shapes of the island shapes of semiconductor layer 62, the level differences 83 conforming to the shapes of the apertures 70 and the semiconductor layer 62, and the recess 85 conforming to the shapes of the contact hole 75 in the interlayer insulating layer 24 are formed.

Next, as shown in FIG. 25(*e*) and FIG. 26(*e*), a photosensitive acrylic resin is applied onto the substrate by spin-coating, whereby the interlayer insulating layer 24 is formed. In the interlayer Insulating layer 24, by photolithography technique or the like, the contact hole 65 is formed over the drain electrode 64, and the contact hole 65' is formed over the reflective layer 61.

Finally, after stacking a transparent electrode film of ITO, IZO, or the like on the interlayer insulating layer 24 by sputtering technique or the like, the transparent electrode film is pattern-shaped by photolithography technique to form the pixel electrode 26 and the counter electrode 281, whereby the TFT substrate 12 shown in FIG. 23 and FIG. 24 is completed.

Embodiment 7

Next, with reference to FIGS. 27 to 30, a seventh embodiment of the liquid crystal display device according to the present invention will be described.

Similarly to Embodiment 6, the liquid crystal display device of the present embodiment is an IPS mode transflective-type liquid crystal display device, and its construction is basically the same as that shown in FIG. 1, except for the TFT substrate 12. Therefore, the construction of the TFT substrate 12 will be mainly described below, and the descriptions of any portion that is identical to Embodiment 1 will be omitted, including the production method, effects, and the like. Moreover, constituent elements which are identical to those of Embodiment 1 will be denoted by like reference numerals, and descriptions thereof will be omitted.

Figure 27:
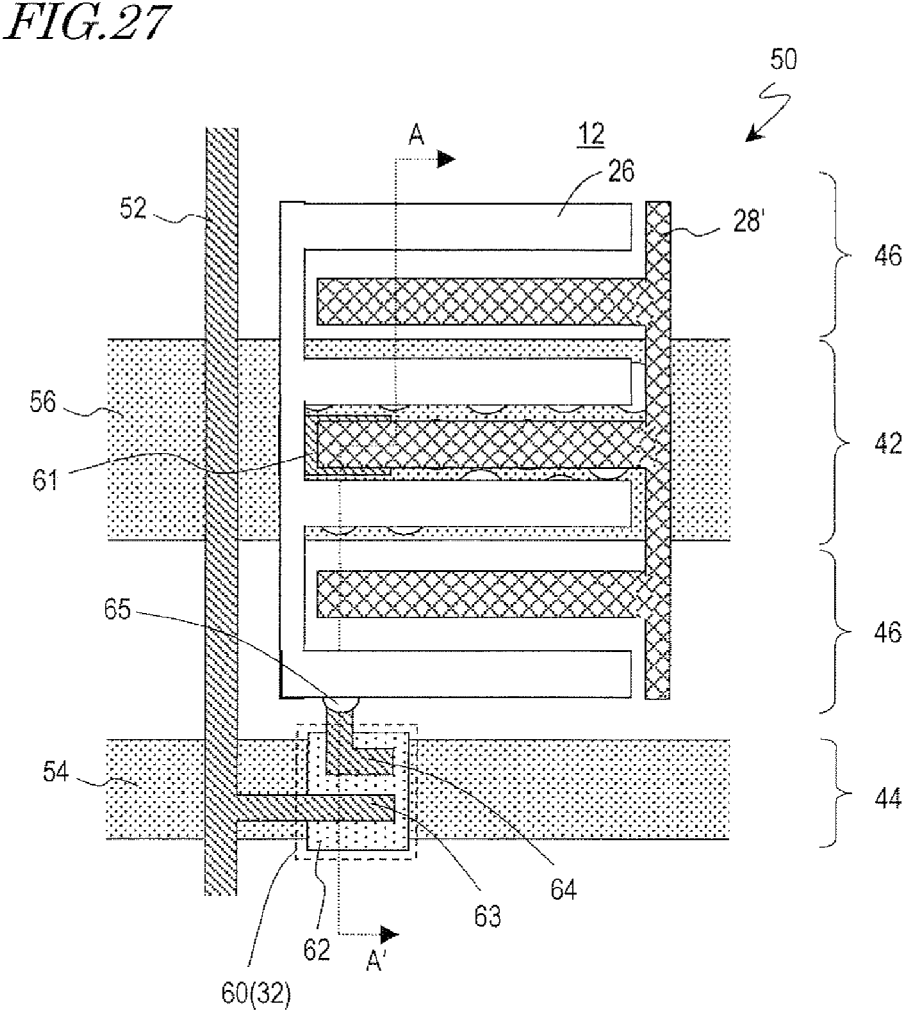
FIG. 27 A plan view schematically showing the construction of a TFT substrate of a liquid crystal display device of Embodiment 7.
Figure 28:
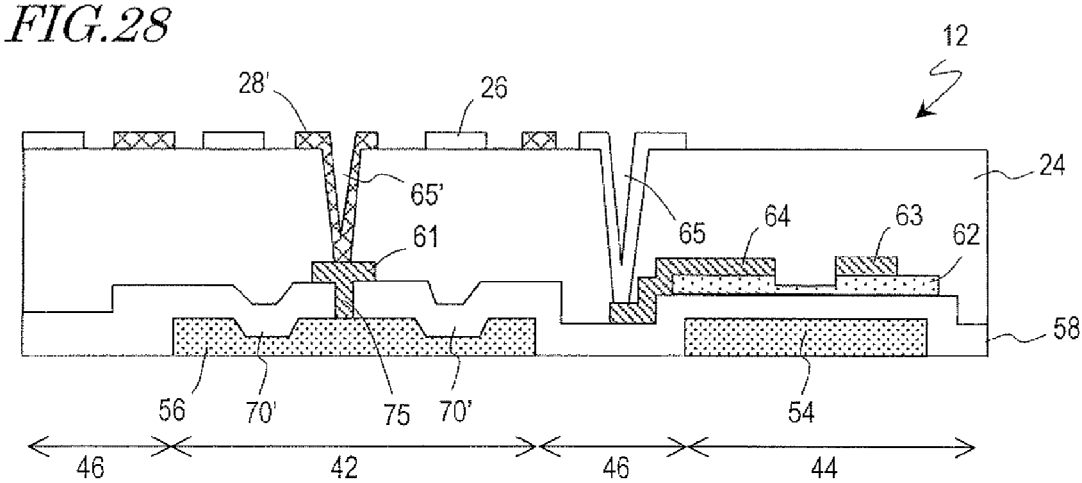
FIG. 28 A diagram schematically showing a cross-sectional structure of the TFT substrate of the liquid crystal display device of Embodiment 7.

FIG. 27 is a plan view schematically showing the construction of the TFT substrate 12 corresponding to one pixel 50 of the liquid crystal display device of the present embodiment. FIG. 28 is a cross-sectional view schematically showing an A-A' cross section of the TFT substrate 12 shown in FIG. 27.

As shown in FIG. 27 and FIG. 28, on the upper face of the TFT substrate 12 in Embodiment 7 (the upper face of the interlayer insulating layer 24), a pixel electrode 26 and a counter electrode 28' in interdigitated shapes each having a plurality of projections are formed, and orientation control of the liquid crystal is performed in accordance with a voltage which is applied between the projections of the pixel electrode 26 and the projections of the counter electrode 281.

The pixel electrode 26 is electrically connected to the drain electrode 64 of the TFT 60 via a contact hole 65 which is formed in the interlayer insulating layer 24, whereas the counter electrode 28' is electrically connected to the reflective layer 61 formed in the reflection region 42 via a contact hole 65' which is formed in the interlayer insulating layer 24. However, since the reflective layer 61 is formed only under a portion of the counter electrode 28 in Embodiment 7, a reflective layer's function of reflecting incident light toward the display surface pertains to the Cs metal layer 56 herein.

In the portion of the reflection region 42 that is under the reflective layer 61, the Cs metal layer 56 and the insulating layer 58 are formed in this order from the bottom. The semiconductor layer 62 is not formed in the reflection region 42. The reflective layer 61 is electrically connected to the Cs metal layer 56 via a contact hole 75 which is formed in the insulating layer 58. Therefore, the counter electrode 28' is electrically connected to the Cs metal layer 56 via the contact hole 651, the reflective layer 61, and the contact hole 75.

Since the Cs metal layer 56 has a function as a reflective layer, recesses 70' are formed in the Cs metal layer 56, rather than apertures. Since the recesses 70' are formed, a plurality of corner portion and slopes are formed on the surface of the reflective layer 61, thus improving the efficiency of utility of reflected light.

Next, with reference to FIG. 29 and FIG. 30, a production method for the TFT substrate 12 of the Embodiment 7 will be described.

Figure 29:
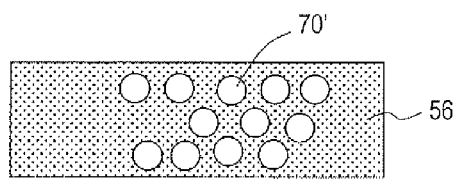
FIG. 29 Plan views showing a production method for the TFT substrate of Embodiment 7.
Figure 29:
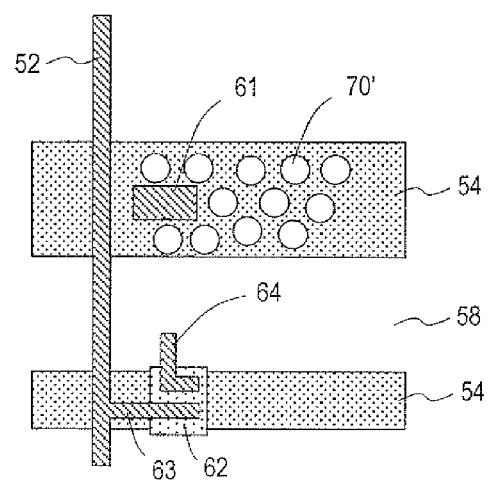
Figure 29:
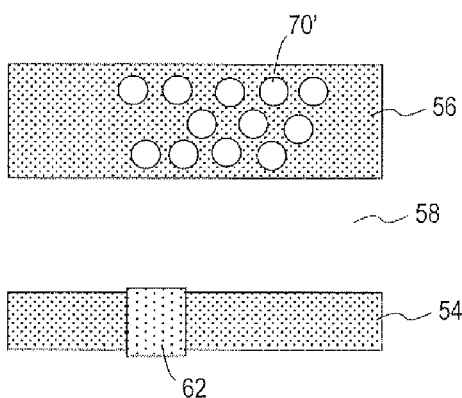
Figure 29:
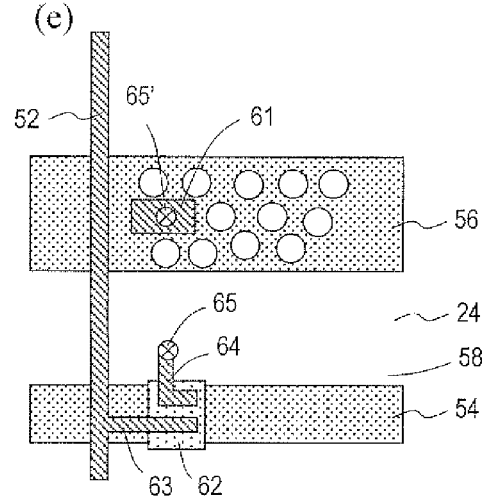
Figure 29:
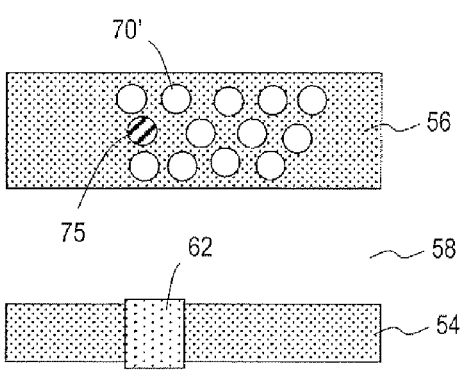
Figure 30:
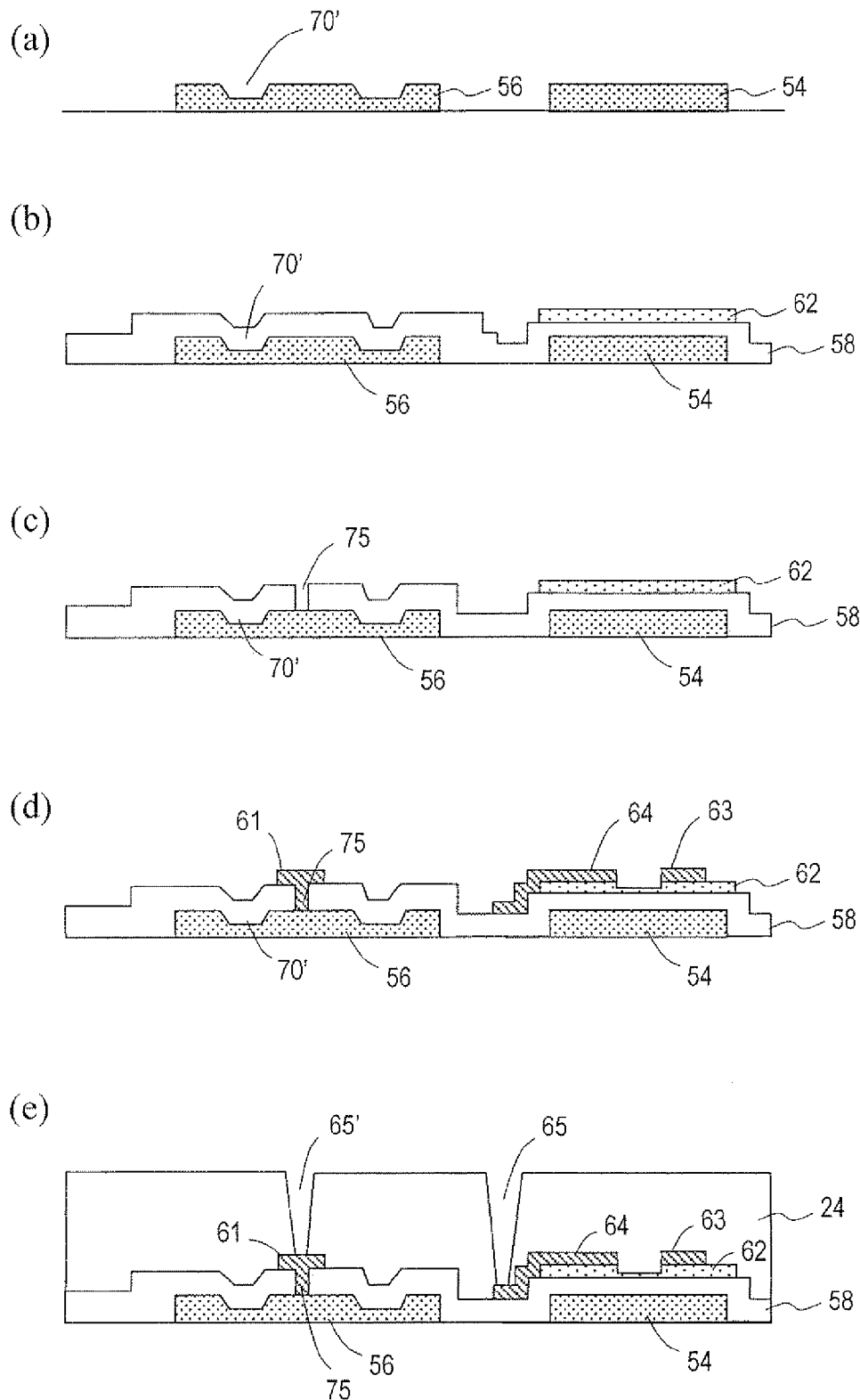
FIG. 30 Cross-sectional views showing the production method for the TFT substrate of Embodiment 7.
Figure 31:
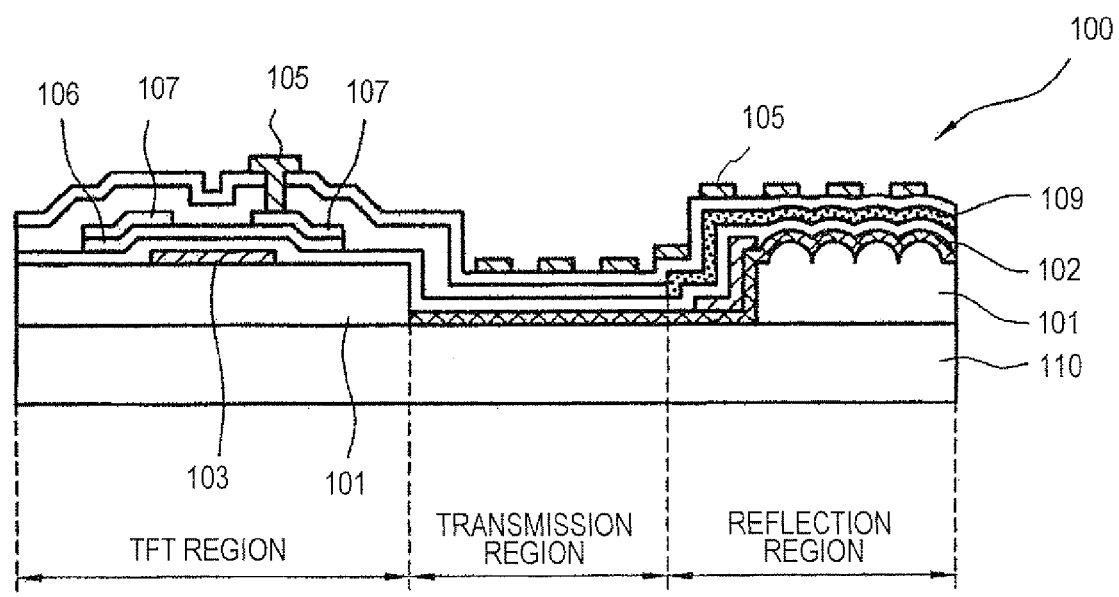
FIG. 31 A cross-sectional view showing the construction of a lower substrate of a conventional FFS mode transflective-type liquid crystal display device.
Figure 32:
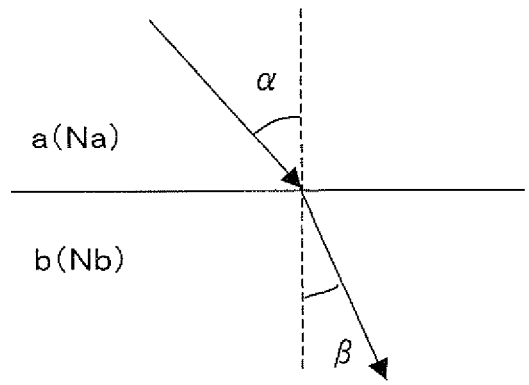
FIG. 32 A diagram showing a relationship between a tilt of a reflection surface and reflected light in a liquid crystal display device, where (a) shows a relationship between an incident angle $\alpha$ and an outgoing angle $\beta$ when light enters a medium b having a refractive index Nb from a medium a having a refractive index Na, and (b) is a diagram showing a relationship between incident light and reflected light as well as the angle of the display surface of the LCD.
Figure 32:
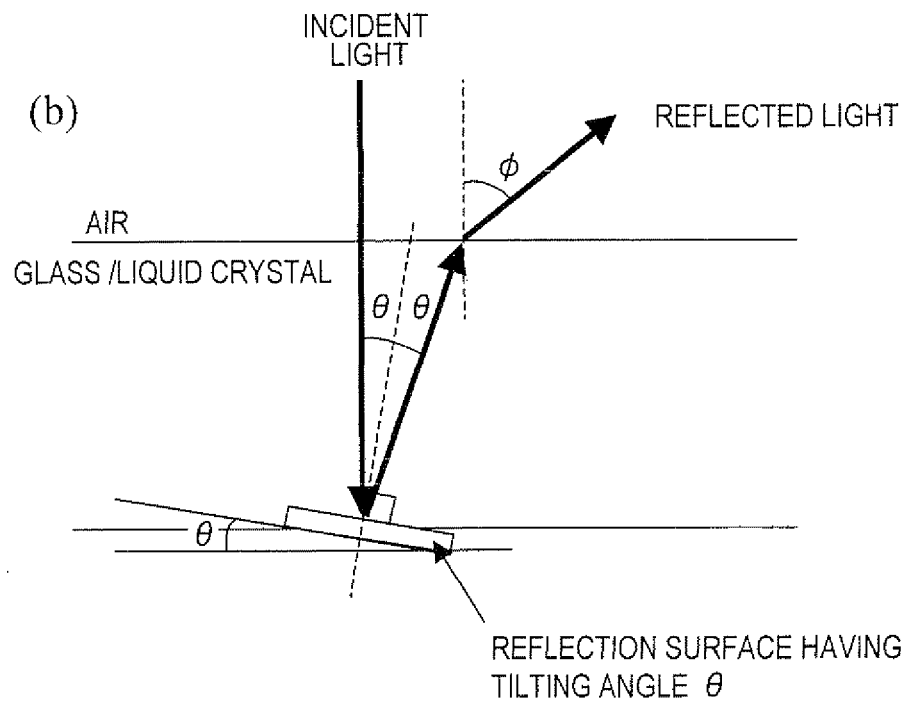

FIG. 29 is plan views for describing a production method for the TFT substrate 12, schematically showing production steps for the portion shown in FIG. 27. FIG. 30 is cross-sectional views for describing a production method for the TFT substrate 12, schematically showing production steps for the portion shown in FIG. 28.

As shown in FIG. 29(a) and FIG. 30(a), first, by a method such as sputtering, a thin metal film of Ta (tantalum) or the like is formed, and the gate electrode 54 and the Cs metal layer 56 are formed by photolithography technique. At this time, the recesses 701 are formed in the Cs metal layer 56. Note that, in this step, the gate line 54 and the Cs line 56 shown in FIG. 27 are also formed concurrently from the same metal.

Next, as shown in FIG. 29(b) and FIG. 30(b), the insulating layer 58 is stacked on the entire substrate surface, and a semiconductor film is stacked thereupon. Thereafter, the stacked semiconductor film is shaped by photolithography technique to form the semiconductor layer 62. Herein, any semiconductor film that has been stacked in the reflection region 42 is removed, and no semiconductor layer 62 is formed in the reflection region 42.

Next, as shown in FIG. 29(c) and FIG. 30(c), the contact hole 75 is formed in the insulating layer 58 by photolithography technique or the like.

Next, as shown in FIG. 29(d) and FIG. 30(d), a thin metal film of Al or the like is stacked on the entire substrate surface by sputtering technique or the like, and a photolithography technique is employed to form the source electrode 63, the drain electrode 64, the reflective layer 61, and the source line 52. At this time, in the reflection region 42, the reflective layer 61 is formed only over the contact hole 75 so as to cover the contact hole 75.

Next, as shown in FIG. 29(e) and FIG. 30(e), a photosensitive acrylic resin is applied onto the substrate by spin-coating, whereby the interlayer insulating layer 24 is formed. In the interlayer insulating layer 24, by photolithography technique or the like, the contact hole 65 is formed over the drain electrode 64, and the contact hole 651 is formed over the reflective layer 61.

Finally, after stacking a transparent electrode film of ITO, IZO, or the like on the interlayer insulating layer 24 by sputtering technique or the like, the transparent electrode film is pattern-shaped by photolithography technique to form the pixel electrode 26 and the counter electrode 28', whereby the TFT substrate 12 shown in FIG. 27 and the FIG. 28 is completed.

Although the above Embodiments illustrate that the plurality of apertures and recesses that are formed in the Cs metal layer 56 in the reflection region 42 are all circular as viewed perpendicularly to the substrate, some or all of these apertures and recesses may be formed in other shapes, e.g., ellipses or rectangles. Although it has been illustrated that a plurality of circular-island shapes of semiconductor layer 62 are formed in the reflection region 42, some or all of these may be formed in other shapes, e.g., ellipses or rectangles.

When forming the contact hole 75 in the insulating layer 58 under the reflective layer 61, recesses may be formed in the insulating layer 58 concurrently with the formation of the contact hole 75. As a result, more recesses and level differences can be formed in the reflective layer 61, thus improving the efficiency of utility of reflected light.

In the case where the Cs metal layer 56, the insulating layer 58, and the semiconductor layer 62 are located under the reflective layer 61 in the reflection region 42, apertures, recesses, protrusion, and the like may be formed by employing halftone exposure during the shaping of these layers. By employing halftone exposure, it becomes possible to easily adjust the tilting angles of the side faces of the apertures and the like to desired angles, and it becomes easy to provide more level differences inside the apertures and the like. As a result, slopes having more corner portions and desired tilting angles are formed in the reflective layer 61, thus improving the efficiency of utility of reflected light.

Moreover, when viewed from the substrate normal direction, the apertures and the like to be formed in the respective layers may be disposed in a manner of overlapping concentric circles, but more preferably, they may be disposed so that the edges of the apertures and the like overlap. In the case where the edges of the apertures and the like overlap, more complicated rugged structures are formed on the surface of the reflective layer 61, thus allowing the reflected light to be uniformly reflected in a broader range.

It is preferable that as many recesses, protrusions, and level differences as possible are formed in the reflective layer 61. For this purpose, sizes and shapes of the recesses or the like are not limited to those described above, but they may be formed into various shapes such as polygons other than rectangles, recesses or the like with sawtoothed edges, or combines thereof.

As has been illustrated by the above Embodiments, a liquid crystal display device according to the present invention includes a large number of level differences and corner portions on the surface of a reflective layer, as well as a multitude of slopes with a tilting angle of 20 degrees or less, and therefore acquires reflection regions with broad effective reflection surfaces and excellent scattering characteristics. Moreover, since the level differences and corner portions on the reflection surface are formed based on layers which are shaped concurrently with the shaping of a gate layer of TFTs, a semiconductor layer, a source electrode, or a drain electrode, a reflection region having excellent reflection characteristics can be easily obtained without increasing the production steps. Therefore, a liquid crystal display device that is capable of uniform and high-brightness displaying can be inexpensively provided with a good production efficiency.

Since the liquid crystal display device according to the present invention is formed by the above-described production method, it can be produced with the substantially the same material and steps as those of a transmission-type liquid crystal display device. Therefore, a liquid crystal display device with an excellent reflection efficiency can be provided at low cost.

The liquid crystal display device according to the present invention encompasses display apparatuses, television sets, mobile phones, etc., in which a liquid crystal panel is utilized. Although the present embodiments employ transflective-type liquid crystal display devices as examples, a reflection-type liquid crystal display device or the like having a configuration similar to the aforementioned reflection section is also encompassed as an embodiment of the present invention.

INDUSTRIAL APPLICABILITY

According to the present invention, a transflective-type liquid crystal display device and a reflection-type liquid crystal display device of the FFS mode and the IPS mode having a high image quality can be provided at low cost. Liquid crystal display devices according to the present invention are suitably used for various liquid crystal display devices, and are suitably used for transflective-type liquid crystal display devices and reflection-type liquid crystal display devices which perform display by utilizing reflected light, e.g., mobile phones, onboard display devices such as car navigation systems, display devices of ATMs and vending machines, etc., portable display devices, laptop PCs, and the like.

The invention claimed is:

1. A liquid crystal display device comprising:
a first substrate and a second substrate between which liquid crystal is interposed;
a first electrode and a second electrode formed on the first substrate for applying a voltage for controlling an orientation of the liquid crystal;
a transistor having an electrode which is electrically connected to the first electrode;
a metal layer formed on the first substrate, the metal layer including a protrusion, a recess, or an aperture;
a reflective layer formed above the metal layer in the first substrate, the reflective layer reflecting incident light toward a display surface, wherein,
the metal layer is made of a same material as that of a gate electrode of the transistor; and
the reflective layer includes a protrusion, a recess, or a level difference which is formed in accordance with the protrusion, recess, or aperture of the metal layer; and
under the reflective layer, a semiconductor layer made of a same material as a semiconductor portion of the transistor, the semiconductor layer including a protrusion, a recess, or an aperture, wherein, the reflective layer includes a protrusion, a recess, or a level difference which is formed in accordance with the protrusion, recess, or aperture of the semiconductor layer.

2. The liquid crystal display device of claim 1, wherein,
the second electrode includes a protrusion, a recess, or an aperture; and
the reflective layer includes a protrusion, a recess, or a level difference which is formed in accordance with the protrusion, recess, or aperture of the second electrode.

3. The liquid crystal display device of claim 1, wherein the reflective layer is made of a same material as that of a source electrode or a drain electrode of the transistor.

4. The liquid crystal display device of claim 1, wherein,
an insulating layer is formed between the metal layer and the second electrode; and
a contact hole electrically connecting the metal layer and the second electrode is formed in the insulating layer.

5. A liquid crystal display device comprising:
a first substrate and a second substrate between which liquid crystal is interposed;
a first electrode and a second electrode formed on the first substrate for applying a voltage for controlling an orientation of the liquid crystal;
a transistor having an electrode which is electrically connected to the first electrode;
a metal layer formed on the first substrate, the metal layer including a protrusion, a recess, or an aperture;
a reflective layer formed above the metal layer in the first substrate, the reflective layer reflecting incident light toward a display surface, wherein,
the metal layer is made of a same material as that of a gate electrode of the transistor; and
the reflective layer includes a protrusion, a recess, or a level difference which is formed in accordance with the protrusion, recess, or aperture of the metal layer; and
wherein the reflective layer includes an aperture.

6. The liquid crystal display device of claim 1, wherein,
the second electrode is formed under the metal layer, and includes a protrusion, a recess, or an aperture; and
the metal layer includes a protrusion, a recess, or a level difference which is formed in accordance with the protrusion, recess, or aperture of the second electrode.

7. The liquid crystal display device of claim 1, wherein the first electrode is a pixel electrode, and the second electrode is a counter electrode formed under the first electrode.

8. The liquid crystal display device of claim 1, wherein the first electrode is a pixel electrode, and the second electrode is a counter electrode formed on a same plane as the first electrode.

9. A production method for a liquid crystal display device including a first substrate and a second substrate between which liquid crystal is interposed and a first electrode and a second electrode for applying a voltage for controlling an orientation of the liquid crystal, the liquid crystal display device having: a reflection region including a reflective layer for reflecting incident light toward a display surface; and a TFT region, the production method comprising the steps of:

(a) forming a gate layer in the TFT region;

(b) forming a semiconductor layer above the gate layer in the TFT region;

wherein, at step (b), in the reflection region a semiconductor layer including a protrusion, a recess, and/or an aperture is formed from a same material as that of the semiconductor layer in the TFT region; and (c) forming a source electrode and a drain electrode above the semiconductor layer in the TFT region, wherein, at step (a), a first metal layer including a protrusion, a recess, or an aperture is formed in the reflection region, from a same material as that of the gate layer of the TFT region, or at step (c), a second metal layer including a protrusion, a recess, or an aperture is formed in the reflection region, from a same material as that of the source electrode or drain electrode in the TFT region.

10. The production method for a liquid crystal display device of claim 9, wherein the first metal layer or the second metal layer constitutes the reflective layer.

11. The production method of claim 9, wherein, at step (c), in the second metal layer, a protrusion, a recess, or a level difference which is in accordance with the protrusion, recess, or aperture of the first metal layer is formed.

* * * * *